US 6,625,577 B1

(12) United States Patent
Jameson

(10) Patent No.: US 6,625,577 B1
(45) Date of Patent: *Sep. 23, 2003

(54) METHODS AND APPARATUS FOR ALLOCATING RESOURCES IN THE PRESENCE OF UNCERTAINTY

(76) Inventor: Joel Jameson, 940 Lundy La., Los Altos, CA (US) 94024

( * ) Notice: Subject to any disclaimer, the term of this patent is extended or adjusted under 35 U.S.C. 154(b) by 62 days.

This patent is subject to a terminal disclaimer.

(21) Appl. No.: 09/777,336

(22) Filed: Feb. 6, 2001

Related U.S. Application Data

(63) Continuation of application No. 09/348,889, filed on Jul. 6, 1999, now Pat. No. 6,219,649
(60) Provisional application No. 60/116,785, filed on Jan. 21, 1999.

(51) Int. Cl.[7] .............................................. G06F 17/60
(52) U.S. Cl. ................................ 705/8; 705/7; 700/99
(58) Field of Search ........................... 705/7, 8, 1, 400; 700/36, 95, 99

(56) References Cited

U.S. PATENT DOCUMENTS

| 4,885,686 A | * | 12/1989 | Vanderbei ..................... 700/99 |
|---|---|---|---|
| 4,914,563 A | * | 4/1990 | Karmarkar et al. ............ 705/8 |
| 4,924,386 A | * | 5/1990 | Freedman et al. ............. 705/8 |
| 5,148,365 A | | 9/1992 | Dembo |
| 5,216,593 A | * | 6/1993 | Dietrich et al. ............... 705/8 |
| 5,255,345 A | | 10/1993 | Shaefer |
| 5,262,956 A | | 11/1993 | DeLeeuw |
| 5,289,370 A | * | 2/1994 | Lirov ............................. 705/8 |
| 5,291,397 A | * | 3/1994 | Powell .......................... 705/8 |
| 5,343,388 A | * | 8/1994 | Wedelin ........................ 705/8 |
| 5,404,516 A | * | 4/1995 | Geordiades et al. ........ 709/104 |
| 5,630,070 A | * | 5/1997 | Dietrich et al. ............... 705/8 |
| 5,649,113 A | * | 7/1997 | Zhu et al. ...................... 705/8 |
| 5,799,287 A | * | 8/1998 | Dembo ......................... 705/36 |
| 5,890,133 A | * | 3/1999 | Ernst ............................. 705/8 |
| 5,913,199 A | * | 6/1999 | Dueck et al. .................. 705/8 |
| 5,963,910 A | * | 10/1999 | Ulwick .......................... 705/7 |
| 6,006,192 A | * | 12/1999 | Cheng et al. .................. 705/7 |
| 6,032,123 A | * | 2/2000 | Jameson ........................ 705/8 |
| 6,035,277 A | * | 3/2000 | Anbil et al. ................... 705/8 |
| 6,219,649 B1 | * | 4/2001 | Jameson ........................ 705/8 |
| 6,263,253 B1 | * | 7/2001 | Yang et al. ................... 700/99 |
| 6,374,227 B1 | * | 4/2002 | Ye ................................. 705/8 |

FOREIGN PATENT DOCUMENTS

| EP | 0 639 815 A2 | * | 2/1995 |
| EP | 0 818 747 A2 | * | 1/1998 |
| WO | WO 92/03905 | * | 3/1992 |

OTHER PUBLICATIONS

Conatser, Kelly, Take It To The Limit: 1–2–3/G's Solver Combines Powerful Optimization Techniques With an Intuitive Graphical Interface, Lotus, vol. 6, No. 11, p. 45, Nov. 1990.*

(List continued on next page.)

Primary Examiner—John W Hayes

(57) ABSTRACT

A method of allocating resources in the presence of uncertainty is presented. The method builds upon deterministic methods and initially creates and optimizes scenarios. The invention employs clustering, line-searching, statistical sampling, and unbiased approximation for optimization. Clustering is used to divide the allocation problem into simpler sub-problems, for which determining optimal allocations is simpler and faster. Optimal allocations for sub-problems are used to define spaces for line-searches; line-searches are used for optimizing allocations over ever larger sub-problems. Sampling is used to develop Guiding Beacon Scenarios that are used for generating and evaluating allocations. Optimization is made considering both constraints, and positive and negative ramifications of constraint violations. Applications for capacity planning, organizational resource allocation, and financial optimization are presented.

1 Claim, 7 Drawing Sheets

OTHER PUBLICATIONS

Balachandran et al, "Capacity Planning with Demand Uncertainty", The Engineering Economist, vol. 43, No. 1, pp. 49–2, Fall 1997.*

Heiring, M.J., "Combinatorial Optimization Maximizes Profit", Hydrocarbon Processing, vol. 76, No. 11, p. 103, Nov. 1997.*

Anupindi et al, "Approximations for Multiproduct Contracts With Stochastic Demands and Business Volumn Discounts: Single Supplier Case", IIE Transactions, vol. 30, No. 8, pp. 723–734, Aug. 1998.*

Bai, D., Carpenter, T. & Mulvey, J., "Making a Case for Robust Optimization Models," *Management Science*, V43N7, pp. 895–907, 1997.

Bazaraa, Mokhtar S., Hanif D. Sherali, C.M. Shetty, *Nonlinear Programming: Theory and Algorithms*, 2nd ed., John Wiley & Sons Inc., New York, 1993.

Brauers, Jutta and Martin Weber, "A New Method of Scenario Analysis for Strategic Planning," *Journal of Forecasting*, vol. 7 No. 1, pp. 31–47, 1988.

Conn, A. R., K. Scheinberg, and Ph.L. Toint, "Recent Progress in Unconstrained Nonlinear Optimization Without Derivatives," *Mathematical Programming*, vol. 79, No. 1–3, Ser. B., pp. 397–414, 1997.

Dupacova, Jitka, "Multistage Stochastic Programs: The State–of–the–Art and Selected Bibliography," *Kybernetika*, vol. 31, No. 2, pp. 151–174, 1995.

Fu, Michael C., "Optimization Via Simulation: A Review," *Annals of Operations Research*, vol. 53, pp. 199–247, 1994.

Grauer, Robert R., "Returns on Levered, Actively Managed Long–run portfolios of Stocks, bonds, and bills 1934–1983," *Financial Analysts Journal*, Sep.–Oct, pp. 24–43, 1985.

Kan, A. H. G. Rinnooy and G. T. Timmer, "Stochastic Global Optimization Methods Part I: Clustering Methods," *Mathematical Programming*, vol. 39, No. 1, pp. 27–56, 1987.

Kan, A. H. G. Rinnooy and G. T. Timmer, "Stochastic Global Optimization Methods Part II: Multi Level Methods," *Mathematical Programming*, vol. 39, No. 1, pp. 57–78, 1987.

Michaud, Richard O., *Efficient Asset Management*, Harvard Business School Press, Boston Massachusetts, 1998.

Mulvey, John M. and Andrzej Ruszczynski, "A New Scenario Decomposition Method for Large–Scale Stochastic Optimization," *Operations Research*, vol. 43, No. 3, pp. 477–490, 1995.

Nollau, V. and A. Hahnewald–Busch, "An Approximation Procedure for Stochastic Dynamic Programming Based on Clustering of State and Action spaces," *Math. Operationsforsch. Statist., Ser. Optimization*, vol. 10, No. 1, pp. 121–130, 1979.

Pflug, Georg Ch., *Optimization of Stochastic Models: The Interface Between Simulation and Optimization*, Kluwer Academic Publishers, Boston, 1996.

Rockafellar, R.T. and Wets, R. J.–B., "Scenarios and Policy Aggregation in Optimization Under Uncertainty," *Mathematics of Operations Research*, vol. 16, No. 1, pp. 119–147, 1991.

Ruszczynski, Andrzej, "Decomposition Methods in Stochastic Programming," *Mathematical Programming*, vol. 79, No. 1–3, Ser. B., pp. 333–353, 1997.

Schoen, F., "Stochastic Techniques for Global Optimization: A Survey of Recent Advances", *Journal of Global Optimization*, vol. 1, No. 3, pp. 207–228, 1991.

Wets, R.J.–B., "Stochastic Programming", In Handbooks In: *Operations Research and Management Science vol. 1: Optimization*; Nemhauser, G. L., A. H. G. Rinnooy Kan, and M. J. Todd (ed),, North–Holland Publishing Co., Amsterdam, pp. 573–629, 1989.

Wets, Roger J–B., "The Aggregation Principle in Scenario Analysis and Stochastic Optimization". In: *Algorithms and Model Formulations in Mathematical Programming*, (S.W. Wallace Ed.), Springer–Verlag, Berlin, pp. 91–113, 1989.

Jameson, Joel; Method of Allocating Resources in a Stochastic Environment; Nonpublished; submitted as a Disclosure Document Number S00463, Jul. 9, 1997.

Jameson, Joel; Method of Allocating Resources in a Stochastic Environment –Further Considerations; Nonpublished; submitted as a Disclosure Document Number S00730, Mar. 16, 1998.

Jameson, Joel; Method of Allocating Resources in a Stochastic Environment –Further Considerations II; Nonpublished; submitted as a Disclosure Document Number S00743, Apr. 10, 1998.

Jameson, Joel; Method of Allocating Resources in a Stochastic Environment –Further Considerations III; Nonpublished; submitted as a Disclosure Document Number S00764, May 11, 1998.

Jameson, Joel; Method of Allocating Resources in a Stochastic Environment –Further Considerations IV; Nonpublished; submitted as a Disclosure Document Number S00814, Jul. 24, 1998.

Jameson, Joel; Methods and Apparatus for Allocating Resources in an Uncertain Environment–PPA Draft I; Nonpublished; submitted as a Disclosure Document Number S00901, Dec. 14, 1998.

Jameson, Joel; Methods and Apparatus for Allocating Resources in an Uncertain Environment–PPA Draft II; Nonpublished; submitted as a Disclosure Document Number S00905, Dec. 18, 1998.

Jameson, Joel; Methods and Apparatus for Allocating Resources in an Uncertain Environment–PPA Draft III; Nonpublished; submitted as a Disclosure Document Number S00914, Jan. 6, 1999.

* cited by examiner

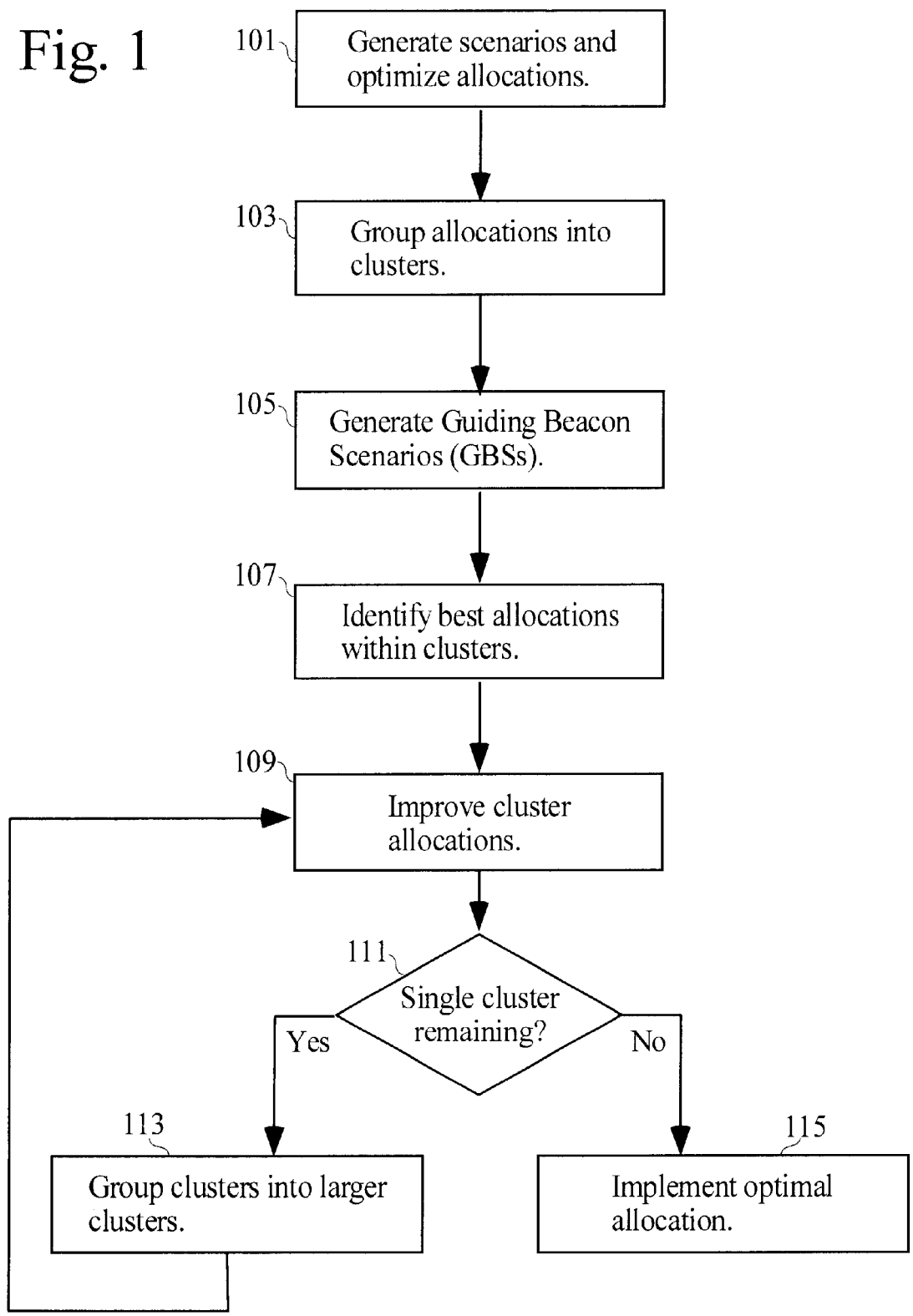

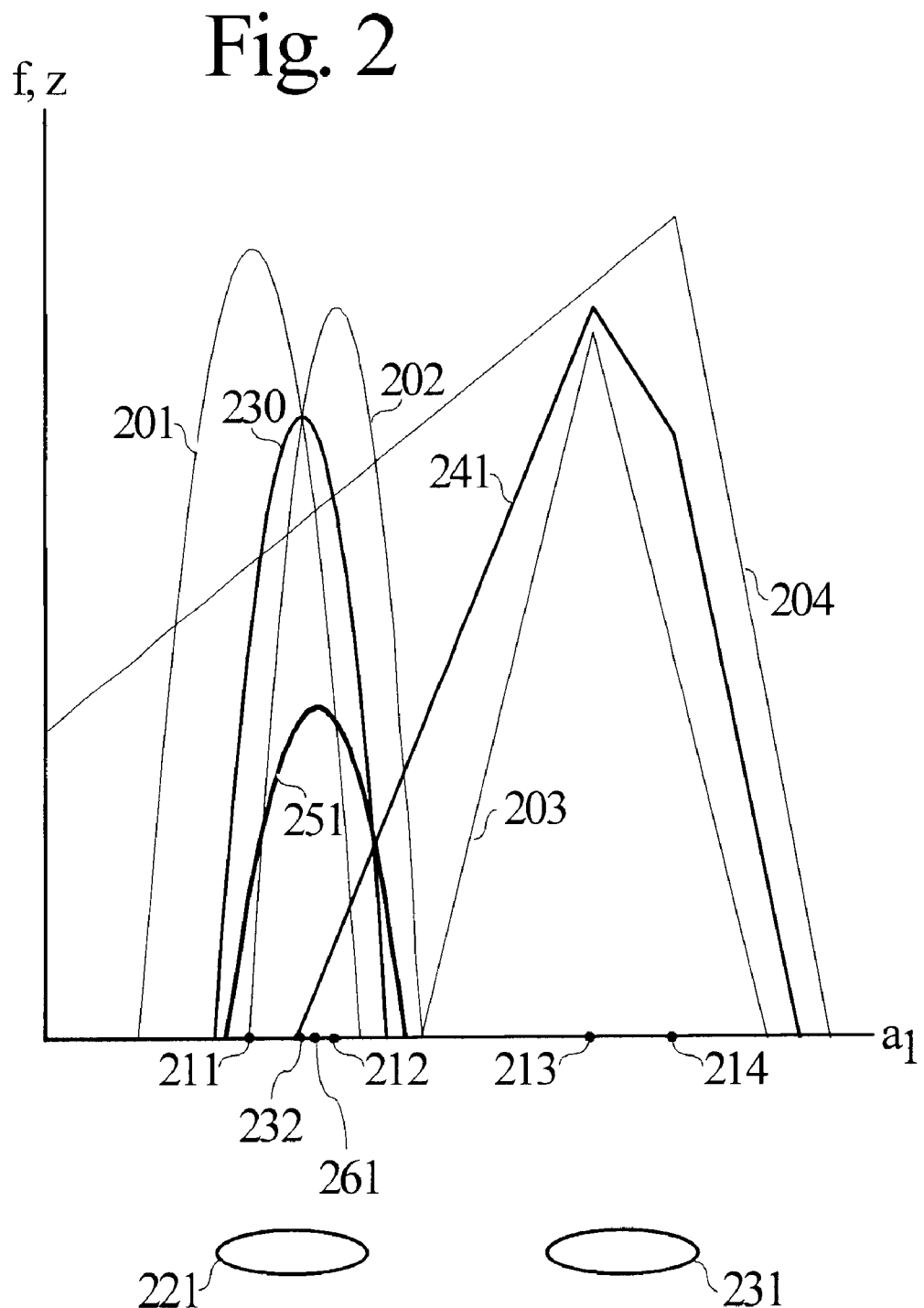

Fig. 5

```
class WNode : public...
    {
    pGBS;
    pWScenario;
    xAllocRndCntn;
    nodeProbability;
    voa;
    nextWNodeCntn;
    };
```

Fig. 6

```
class WScenario : public...
    {
    wwMatrix;
    pWNode[nStage+1];
    nativeProbability;
    nativeXAlloc;
    NativeOptimizer();
    };
```

Fig. 7

```
class XAlloc : public...
    {
    al[];
    feasible;
    h;
    voa;
    operator=( XAlloc& s);
    operator==(XAlloc& r);
    operator!=(XAlloc& r);
    };
```

Fig. 8A

```
class WWMatrix : public...
    {
    ww[][nStage];
    h;
    voa;
    };
```

Fig. 8B

```
class AAMatrix : public...
    {
    aa[][nStage+1];
    h;
    voa;
    };
```

Fig. 9

```
EvaluateXAllocAgainstWScenario(xAlloc, wScenario)
    {
    AAMatrix aaMatrix;
    copy xAlloc.al to aaMatrix.aa[][1];

for(iFlexStage=2;iFlexStage<=nStage;iFlexStage++)
        {
        DeterministicOptimizer(iFlexStage, aaMatrix,
          wScenario.pWNode[iFlexStage]->pGBS->wwMatrix);
        }
    xAlloc.voa = aaMatrix.voa;
    }
```

Fig. 10

```
DeterministicOptimizer(iFlexStage, aaMatrix, wwMatrix)
    {
    Assuming that the allocations in aaMatrix for
    stages prior to stage iFlexStage are fixed, and
    that the scenario specified in wwMatrix occurs
    with certainty:
        {
        Apply prior-art techniques to optimize
        allocations for stages iFlexStage to
        nStage.
        }

Transfer allocations for stage iFlexStage to
    aaMatrix.aa[][iFlexStage]. Transfer
    allocations for stages beyond iFlexStage to
    corresponding columns in aaMatrix.aa.

ValueAllocation(aaMatrix, wwMatrix);
    }
```

Fig. 11

```
ValueAllocation(aaMatrix, wwMatrix)
    {
    Assess wwMatrix together with aaMatrix.
    Determine an assessed value indicative
    of the desirably of having wwMatrix and
    aaMatrix occur together, as opposed to
    any other pair occurring.

Set wwMatrix.voa = assessed value;
    Set aaMatrix.voa = assessed value;
    }
```

Fig. 12
```
class ZCluster : public...
{
    wScenarioCntn;
    xAllocBestCntn;
    xAllocOpt;
    XAllocEvaluator(xAlloc, OKadd);
    ConsiderAppendBestXAlloc(xAllocAdd, xAllocDel);
    Improver();
    SimpleParabolaSearch();
    InnerCompressSearch();
    OuterCompressSearch();
    GenxAlloch(h);
    xAllocHurdle;
    wasImproved;
    xAlloc0;
    xAlloc0off;
    xAlloc1;
    xAlloch;
    xAllocBnd;
};
```
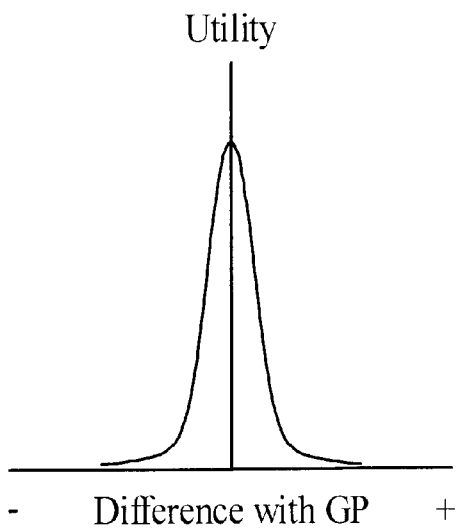
Fig. 13A
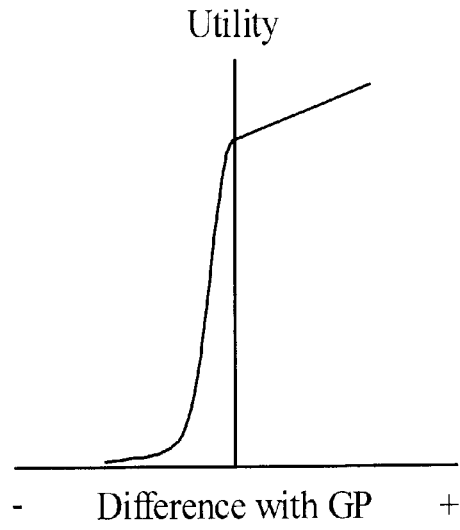
Fig. 13B

METHODS AND APPARATUS FOR ALLOCATING RESOURCES IN THE PRESENCE OF UNCERTAINTY

CROSS REFERENCE TO RELATED APPLICATIONS

The present application is a continuation of non-provisional application Ser. No. 09/348,889 filed on Jul. 6, 1999, now U.S. Pat. No. 6,219,649.

By reference the following documents, submitted to the Sunnyvale Center for Innovation, Invention and Ideas (SCI[3]) under the US Patent and Trademark Office's Document Disclosure Program, are hereby included:

Copending Pat. Application Ser. No. 09/070,130, filed on Apr. 29, 1998 and issued on Feb. 29, 2000 as Pat. No. 6,032,123 is incorporated by reference herein and referred to as PRPA (Prior Relevant Patent). PRPA disclosed and discusses several methods for allocating resources.

BACKGROUND TECHNICAL FIELD

This invention relates to methods and systems for allocating resources in an uncertain environment.

By reference the following documents, submitted to the Sunnyvale Center for Innovation, Invention and Ideas (SCI[3]) under the US Patent and Trademark Office's Document Disclosure Program, are hereby included:

| Title | Number | Date |
| --- | --- | --- |
| Method of Allocating Resources in a Stochastic Environment | S00463 | Jul. 9, 1997 |
| Method of Allocating Resources in a Stochastic Environment - Further Considerations | S00730 | Mar. 16, 1998 |
| Method of Allocating Resources in a Stochastic Environment - Further Considerations II | S00743 | Apr. 10, 1998 |
| Method of Allocating Resources in a Stochastic Environment - Further Considerations III | S00764 | May 11, 1998 |
| Method of Allocating Resources in a Stochastic Environment - Further Considerations IV | S00814 | Jul. 24, 1998 |
| Methods and Apparatus for Allocating Resources in an Uncertain Environment - PPA Draft I | S00901 | Dec. 14, 1998 |
| Methods and Apparatus for Allocating Resources in an Uncertain Environment - PPA Draft II | S00905 | Dec. 18, 1998 |
| Methods and Apparatus for Allocating Resources in an Uncertain Environment - PPA Draft III | S00914 | Jan. 6, 1999 |

BACKGROUND OF PRIOR ART

Almost all organizations and individuals are constantly allocating material, financial, and human resources. Clearly, how best to allocate such resources is of prime importance.

Innumerable methods have been developed to allocate resources, but they usually ignore uncertainty: uncertainty as to whether the resources will be available; uncertainty as to whether the resources will accomplish what is expected; uncertainty as to whether the intended ends prove worthwhile. Arguably, as the increasingly competitive world-market develops, as technological advancements continue, and as civilization becomes ever more complex, uncertainty becomes increasingly the most important consideration for all resource allocations.

Known objective methods for allocating resources in the face of uncertainty can be classified as Detailed-calculation, stochastic programming, scenario analysis, and Financial-calculus. (The terms "Detailed-calculation", "Financial-calculus", "Simple-scenario analysis", and "Convergent-scenario analysis" are being coined here to help categorize prior-art.) (These known objective methods for allocating resources are almost always implemented with the assistance of a computer.)

In Detailed-calculation, probabilistic results of different resource allocations are determined, and then an overall best allocation is selected. The first historic instance of Detailed-calculation, which led to the development of probability theory, was the determination of gambling-bet payoffs to identify the best bets. A modern example of Detailed-calculation is U.S. Pat. No. 5,262,956, issued to DeLeeuw and assigned to Inovec, Inc., where yields for different timber cuts are probabilistically calculated, and the cut with the best probabilistic value is selected. The problem with DeLeeuw's method, and this is a frequent problem with all Detailed-calculation, is its requirement to enumerate and evaluate a list of possible resource allocations. Frequently, because of the enormous number of possibilities, such enumeration and valuation is practically impossible.

Sometimes to allocate resources using Detailed-calculation, a computer simulation is used to evaluate:

$$Z_{dc} = E(f_{dc}(x_{dc})) \qquad (1.0)$$

where vector $x_{dc}$ is a resource allocation plan, the function $f_{dc}$ evaluates the allocation in the presence of random, probabilistic, and stochastic events or effects, and E is the mathematical expectation operator. With such simulation capabilities, alternative resource allocations can be evaluated and, of those evaluated, the best identified. Though there are methods to optimize the function, such methods often require significant amounts of computer time and hence are frequently impractical. (See Michael C. Fu's article "Optimization via Simulation: A Review," *Annals of Operations Research* Vol. 53 (1994), p. 199–247 and Georg Ch. Pflug's book *Optimization of Stochastic Models: The Interface between Simulation and Optimization*, Kluwer Academic Publishers, Boston, 1996.) (Generally known approximation solution techniques for optimizing equation 1.0 include genetic algorithms and response surface methods.)

A further problem with Detailed-calculation is the difficulty of handling multiple-stage allocations. In such situations, allocations are made in stages and between stages, random variables are realized (become manifest or assume definitive values). A standard solution approach to such multiple-stage Detailed-calculation resource allocations is dynamic programming where, beginning with the last stage, Detailed-calculation is used to contingently optimize last-stage allocations; these contingent last-stage allocations are then used by Detailed-calculation to contingently optimize the next-to-the-last-stage allocations, and so forth. Because dynamic programming builds upon Detailed-calculation, the problems of Detailed-calculation are exacerbated. Further, dynamic programming is frequently difficult to apply.

Stochastic programming is the specialty in operations research/management science (OR/MS) that focuses on extending deterministic optimization techniques (e.g., linear programming, non-linear programming, etc.) to consider uncertainty. The general solution approach is to construct and solve an optimization model that incorporates all the possibilities of what could happen. Unless the resulting optimization model is a linear programming model, the usual problem with such an approach is that the resulting optimization problem is too big to be solved; and aside from size considerations, is frequently unsolvable by known solution means. Creating a linear programming model, on the other hand, frequently requires accepting serious distortions and simplifications. Usually, using more than two stages in a stochastic programming problem is impractical, because the above-mentioned computational problems are seriously aggravated. Assumptions, simplifications, and multi-processor-computer techniques used in special stochastic programming situations fail to serve as a general stochastic-programming solution method.

In Simple-scenario analysis, future possible scenarios are created. The allocations for each are optimized, and then, based upon scenario probabilities, a weighted-average allocation is determined. Sometimes the scenarios and allocations are analyzed and, as a consequence, the weights adjusted. The fundamental problem with this method is that it does not consider how the resulting allocation performs against the scenarios, nor does it make any genuine attempt to develop an allocation that, overall, performs best against all individual scenarios. Related to this fundamental problem is the assumption that optimality occurs at a point central to individual scenario optimizations; in other words, that it is necessarily desirable to hedge allocations. Such hedging could, for example, lead to sub-optimality when, and if, the PRPA uses Simple-scenario analysis for allocating resources: because of economies of scale, it could be preferable to allocate large resource quantities to only a few uses, rather than allocate small quantities to many uses. Another practical example concerns allocating military warheads, where hedging can be counter-productive.

Also related to the fundamental problem of scenario analysis is its inability to accommodate utility functions in general, and von Neumann-Morgenstern (VNM) utility functions in particular. Arguably, according to economic theory, utility functions should be used for all allocations when uncertainty is present. Loosely, a utility function maps outcomes to "happiness." The VNM utility function, in particular, maps wealth (measured in monetary units) to utility, has a positive first derivative, and, usually, has a negative second derivative. By maximizing mathematically-expected VNM utility, rather than monetary units, preferences concerning risk are explicitly considered.

(A classic example of Simple-scenario analysis theory is Roger J-B. Wets' thesis, "The Aggregation Principle in Scenario Analysis and Stochastic Optimization," in: *Algorithms and Model Formulations in Mathematical Programming*, S. W. Wallace (ed.), Springer-Verlag, Berlin, 1989, p. 91–113.)

Simple-scenario analysis has been extended to what might be called Convergent-scenario analysis, which starts where Simple-scenario analysis ends. Using a weighted-average allocation, individual scenarios are re-optimized with their objective functions including penalties (or costs) for deviating from the average allocation. Afterwards, a new weighted-average allocation is determined, the penalties made more severe, and the process is repeated until the individual scenarios' optimizations converge to yield the same allocation. The deficiencies of Simple-scenario analysis as previously described remain, though they are somewhat mitigated by the mechanism that coordinates individual-scenario optimizations. The mechanism, however, is contingent upon arbitrary parameter values, and hence the mechanism itself arbitrarily forces convergence. Further, such forced convergence is done without regard to whether the current allocation actually improves. Further still, the convergent mechanism tends to overly weigh scenarios that are highly sensitive to small allocation changes, even though it could be desirable to ignore such scenarios. Incorporating penalties for deviating from the average allocation can be cumbersome, if not impossible, and can result in significantly complicating and protracting the solution procedure.

The Progressive Hedging Algorithm is the most famous of the Convergent-scenario analysis techniques and is described in R. T Rockafellar and Roger J.-B. Wets, "Scenarios and Policy Aggregation in Optimization Under Uncertainty" *Mathematics of Operations Research* Vol. 16 (1991), No. 1, p. 119–147. Other Convergent-scenario analysis techniques are described in John M. Mulvey and Andrzej Ruszczynski, "A New Scenario Decomposition Method for Large-Scale Stochastic Optimization," *Operations Research* 43 (1995), No. 3, p. 477–490, and some of the other prior-art references.

U.S. Pat. No. 5,148,365 issued to Dembo is another scenario-analysis method. Here, as with Simple-scenario analysis, future possible scenarios are created and the allocations for each are optimized. Afterwards, the scenario allocations and parameters, possibly together with other data and constraints, are combined into a single optimization problem, which is solved to obtain a final allocation. Though this method mitigates some of the problems with Simple-scenario analysis, the problems still remain. Most importantly, it does not fully consider how the resulting allocation performs against all individual scenarios. This, coupled with the disparity between objective functions used for optimization and actual objectives, results in allocations that are only fair, rather than nearly or truly optimal. Because this method sometimes uses a mechanism similar to the convergent mechanism of Convergent-scenario analysis, the previously discussed convergent mechanism problems can also occur here.

As a generalization, all types of stochastic programming (and scenario analysis is a form of stochastic programming) can have the following serious deficiencies when allocating resources. First, penalties can introduce distortions. Second, the process of forming tractable models can introduce other distortions. Third, existing techniques are frequently unable to handle discrete quantities. Fourth, constraints are not fully considered, with the result that constraints are violated with unknown ramifications, and, conversely, other constraints are overly respected. Fifth, existing techniques usually presume a single local optimum, though multiple local optimums can be particularly probable. Sixth, existing techniques can require significant computer time to compute gradients and derivatives. Seventh, and perhaps most important, practitioners frequently do not use stochastic programming techniques, because shifting from deterministic techniques is too complex.

Theoretical finance, theoretical economics, financial engineering, and related disciplines share several methods for allocating and pricing resources in the presence of uncertainty. (Methods for valuing or pricing resources also allocate resources, since once a value or price is determined, it can be used for resource allocation internally within an organization and used to decide whether to buy or sell the resource on the open market.) These methods tend to use mathematical equations and calculus for optimization. A frequent problem, however, is that once complicating factors are introduced, the solution techniques no longer work, and either computer-simulation Detailed-calculation or stochastic-programming methods, with their associated problems, are required. A further problem is that such methods, in order to be mathematically tractable, frequently ignore VNM utility functions and work with unrealistically, infinitesimally small quantities and values.

In conclusion, though innumerable methods have been developed to determine how to allocate resources, they frequently are unable to cope with uncertainty. Attempts to include uncertainty frequently result in models that are too big to be solved, unsolvable using known techniques, or inaccurate. As a consequence, resource allocations of both organizations and individuals are not as good as they could be. It is therefore a fundamental object of the present invention to obviate or mitigate the above-mentioned deficiencies.

SUMMARY OF THE INVENTION

Accordingly, besides the objects and advantages of the present invention described elsewhere herein, several objects and advantages of the invention are to optimally, or near optimally, allocate resources in the presence of uncertainty. Specifically, by appropriately:

1. considering how the resulting allocation performs against possible scenarios
2. utilizing von Neumann-Morgenstern or other utility functions
3. hedging and not hedging
4. handling uncertain constraints
5. handling discrete-quantity requirements
6. considering multiple local optimums
7. using and capitalizing on known methods for allocating resources that ignore, or do not explicitly consider, uncertainty
8. using multiple processors.

Additional objects and advantages will become apparent from a consideration of the ensuing description and drawings.

The basis for achieving these objects and advantages, which will be rigorously defined hereinafter, is accomplished by programming a computer as disclosed herein, inputting the required data, executing the computer program, and then implementing the resulting allocation. The programming steps are shown in the flowchart of FIG. 1.

Step 101 entails generating scenarios and optimizing scenario allocations. In Step 103, the optimized allocations are grouped into clusters. In Step 105, first-stage allocations are randomly assigned to scenario nodes and, by using an evaluation and exploration technique to be described, Guiding Beacon Scenarios (GBSs) are generated. Step 107 entails using the GBSs and identifying the allocations within each cluster that perform best against the scenarios within the cluster. In Step 109, allocations that perform better against the scenarios within each cluster are created, typically by considering two of the better allocations, and then using line-search techniques. If there is more than one cluster, then in Step 113 the clusters are merged into larger clusters and processing returns to Step 109. Once only a single cluster remains and Step 109 is complete, the best allocation thus far obtained is taken as the final optimal allocation and is implemented in Step 115.

Numerous other advantages and features of the invention will become readily apparent from the following detailed description of the invention and the embodiments thereof, from the claims, and from the accompanying drawings.

BRIEF DESCRIPTION OF THE DRAWINGS

The invention will be more readily understood with reference to the accompanying drawings, wherein:

FIG. 1 shows a high-level flowchart;

FIG. 2 demonstrates optimized-scenario-allocation and cluster usage;

FIGS. 4A and 4B combined show the scenario-tree used by the present invention;

FIG. 5 is a skeletal definition of the WNode class;

FIG. 6 is a skeletal definition of the WScenario class;

FIG. 7 is a skeletal definition of the XAlloc class;

FIGS. 8A and 8B are skeletal definitions of the WWMatrix and AAMatrix classes;

FIG. 9 is a skeletal definition of the EvaluateXAllocAgainstWScenario function;

FIG. 10 is a skeletal definition of the DeterministicOptimizer function;

FIG. 11 is a skeletal definition of the ValueAllocation function;

FIG. 12 is a skeletal definition of the ZCluster class; and

FIGS. 13A and 13B show special von Neumann-Morgenstern utility functions.

DETAILED DESCRIPTION OF THE INVENTION

Theory of the Invention—Philosophy

Figure 3A:
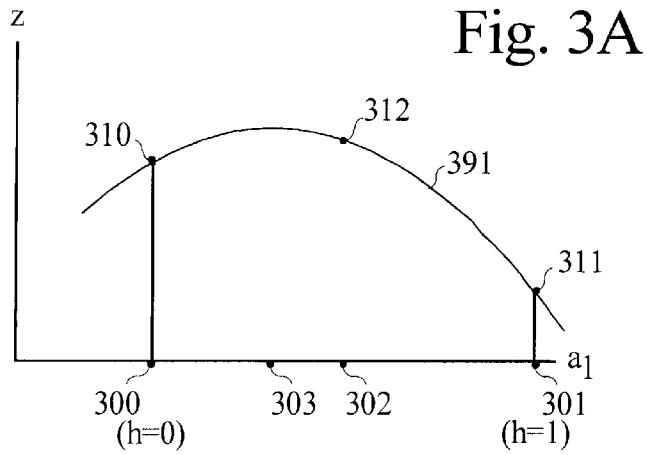
FIGS. 3A, 3B, and 3C demonstrate the three line-search techniques.

The following philosophical assumptions are made:

1. All resource allocations should fundamentally attempt to directly or indirectly optimize one of three things: monetary gain, monetary loss, or what economists term "utility."
2. There is no such thing as a constraint violation; for fundamentally any constraint can be violated, though with consequences. These consequences can be quantified and expressed in the terms of the range of the objective function, provided that the objective function is cast as a fundamental type.
3. The more a constraint is violated, the larger the adverse impact on the fundamental objective being optimized.
4. The adverse effect of a constraint violation is always less than infinity.
5. Both objective and subjective probabilities are useful as imperfect estimates of what could happen.
6. Almost every decision is a resource allocation, because almost every decision directly or indirectly leads to a resource allocation.
7. Every resource allocation (and decision) would be easier and simpler if there was no uncertainty.

As an example of the first four items, a business might have a resource allocation plan that optimizes profits (monetary gain), and among other things fulfills the requirement (constraint) that contractual obligations be met. However, it may happen that fulfilling the contractual obligations becomes impossible. At this point, though the constraint is violated, it is irrelevant. What is relevant is how best to handle the contractual obligations: re-negotiating, performing restitution, fulfilling some of the obligations, etc. Whatever course is chosen, there follows an adverse impact on the business' profits. The more numerous and onerous the contractual obligations, the larger the adverse impact. However, this adverse impact is always less than infinity. There are always degrees of catastrophe: it is better to be short 10M resource units, rather than 20M; it is better to be insolvent by $30M, rather than $50M; etc.

As an example of the fifth item, an objective probability measurement might be obtained by statistical analysis of responses to a large survey, while a subjective value by a guess. Lacking better bases, both are usable and valuable. (Given a choice between the two, however, the objective estimate is usually preferable.)

A consequence of the fifth item is a diminishment of the usual distinction between risk and uncertainty. In common-professional usage, risk suggests known probabilities, while uncertainty suggests unknown probabilities. Philosophically, however, one always can determine a subjective probability estimate. Hence, here no distinction is made between risk and uncertainty; the two words are used interchangeably.

This philosophical section is presented here to facilitate a deeper and broader understanding of how the present invention can be used. However, neither understanding this section nor agreeing with it are required for implementing or using this invention. Hence, this section should not be construed to bound or in any way limit the present invention.

Theory of the Invention—Mathematical Framework

As is standard in stochastic programming, resources in this invention are allocated in one or more stages, and, between stages, what were previously uncertain values either become known, or the uncertainty of their eventual values reduced. Allocations made in one stage affect what can be accomplished in subsequent stages. Mathematically, the general stochastic resource allocation model addressed here is:

$$\text{maximize } z = \sum_{i=\text{each scenario}} p_i \cdot f(a_1, WS_i) \quad (2.0)$$

where,
- $WS_i$ is a matrix containing all the random-variable realizations for scenario i
- $a_1$ is a vector containing first-stage allocations
- $f$ is a function that evaluates first-stage allocations $a_1$ against scenario i
- $p_i$ is the probability of scenario i Implicit within function $f$ is the generation of $a_2, a_3, \ldots$ allocations for the second, third, and so-forth stages. Also implicit is an evaluation of such allocations. (Obviously, the maximizing orientation used here could have just as easily have been reversed.)

The focus here is on determining the optimal vector $a_1$, since those allocations are most immediately relevant, are initially implemented, and are implemented prior to any additional information becoming available.

Several strategies are used in tandem to cope with the inherent NP-hardness of stochastic programming: clustering, line-searching, statistical sampling, and unbiased approximation. Clustering is used to divide the allocation problem into simpler sub-problems, for which determining optimal allocations is computationally simpler and faster. Optimal allocations for sub-problems are used to define sub-spaces for line-searches; line-searches are used for optimizing allocations over ever larger sub-problems. Sampling is used to develop schemes used to generate and evaluate allocations, especially for generating, and in turn using, GBSs.

Figure 3B:
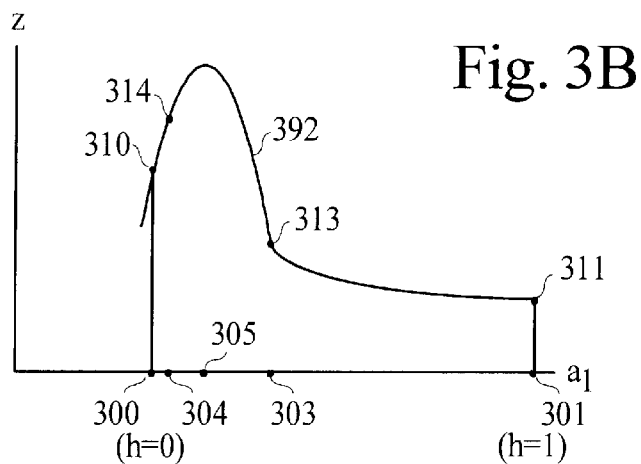
Figure 3C:
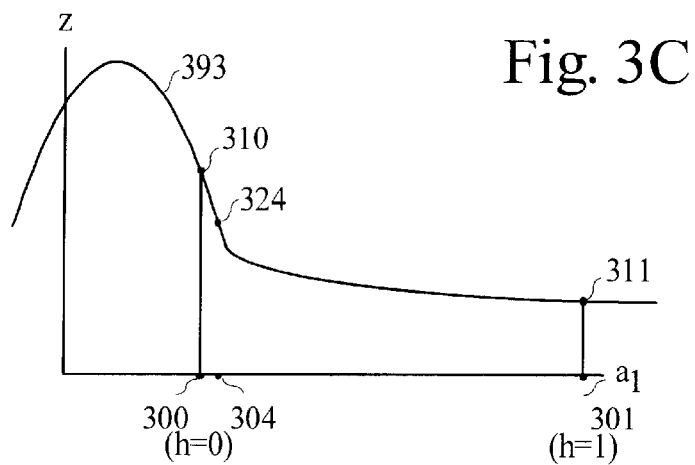
Figure 4B:
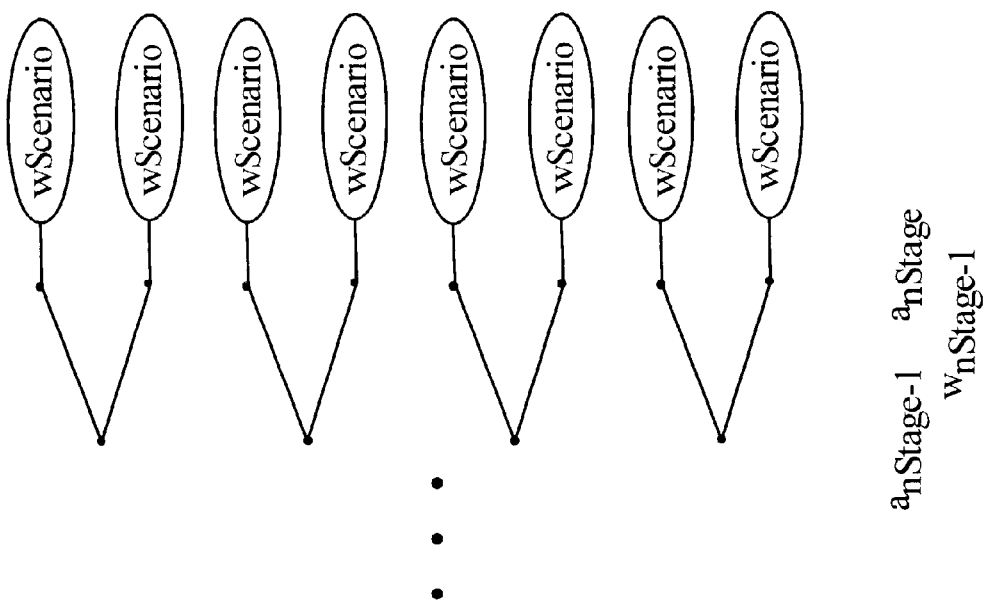
Figure 4A:
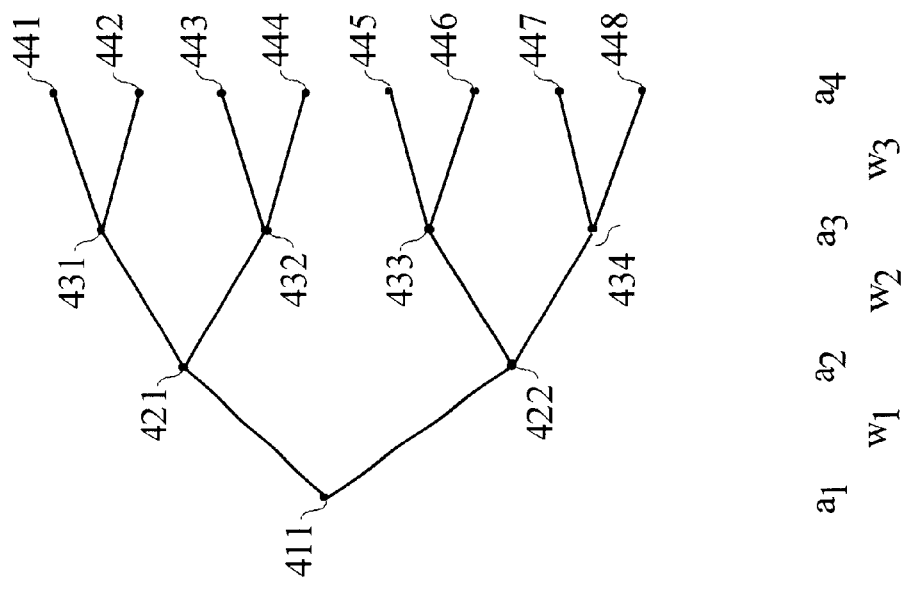
FIG. 4A shows an elementary scenario-tree.

FIGS. 2, 3A, 3B, 3C and 4A demonstrate some basic concepts that were developed as part of this invention: FIG. 2 shows how individual-scenario optimizations can serve as good starting points for finding an overall optimal allocation and how clustering can facilitate optimization; FIGS. 3A, 3B and 3C show the operation of special line-searching techniques to find better allocations; and FIG. 4A shows how GBSs are generated and used to evaluate $a_1$ allocations.

FIG. 2 depicts a hypothetical example with four scenarios. The $a_1$ allocations are shown collapsed into a single dimension on the horizontal axis; the vertical axis shows function $f$ and z values. Curves 201, 202, 203, and 204 show $f$ values as a function of $a_1$ for the first, second, third, and fourth scenarios respectively. The optimal $a_1$ values for the four scenarios are points 211, 212, 213, and 214. Given the four optimal points, they are clustered: points 211 and 212 into a cluster 221; points 213 and 214 into a cluster 231. (The clusters include the scenarios themselves.) The value of z across both the first and second scenarios is shown by curve 230; stated differently, curve 230 shows the probabilistically-weighted average value of curves 201 and 202. The value of z across the third and fourth scenarios by is shown by curve 241. For both clusters, the optimal individual-scenario allocations are good starting points for finding the optimal cluster allocations. Line-search techniques, to be explained shortly, are used to locate a point 232 as the optimal allocation for cluster 221. For cluster 231, however, the third scenario's optimal allocation (point 213) is the best cluster allocation. Now, the iteration repeats: the two cluster allocations points 232 and 213 are clustered into a larger final cluster. The value of z across the four scenarios is shown by curve 251, and as analogous to using optimized-scenario allocations, the optimal allocations for the individual clusters serve as starting points for finding the overall optimal allocation, point 261.

FIGS. 3A, 3B, and 3C show the operation of the three line-search techniques, each of which approximates function z with parabolas. The three techniques build upon one another. As before, the $a_1$ allocations are shown collapsed into a single dimension on the horizontal axis; the vertical axis shows function z values. Points 300 and 301 correspond to two allocations and define the line in the allocation space that is searched. (An allocation is a point in the allocation space, and for the moment the words "allocation" and "point" are used synonymously when they apply to the allocation space represented by the horizontal axis.) These two allocations have z values as indicated by points 310 and 311 respectively. A parameter h, which can range from negative to positive infinity, governs the linear blending of allocations 300 and 301. In the first technique, Simple Parabola Search (SPS), a point 302 is selected (See FIG. 3A); the associated value z, point 312, is determined; a parabola through points 310, 312, and 311 is determined (shown as parabola 391); and the optimum domain value of the parabola, point 303, is evaluated for possibly yielding a better z value.

FIG. 3B shows allocation 303 yielding a value indicated by a point 313, which is inferior to point 310. In such a case, the second technique, Inner Compression Search (ICS), builds upon the failed SPS attempt. ICS hypothesizes that the z function is roughly like curve 392 (shown passing through points 310, 314, 313, and 311), with a local optimum near point 310 and between points 310 and 313. Initially, ICS tests the hypothesis by determining whether an allocation 304, near allocation 300, yields a z value better than allocation 300. If so, the point 313 of the SPS and the points 310 and 314 are used to determine a parabola and the optimum domain value of the parabola, point 305, is evaluated for yielding a better z value. If a better z value is not obtained, then the process repeats: using points 310, 314, and the z-value point for allocation 305, another parabola is determined, and so forth.

If the hypothesis proves incorrect (i.e., allocation 304 yields an inferior z value indicated by a point 324 in FIG. 3C), then the third technique, Outer Compression Search (OCS), builds upon the failed ICS attempt. Because allocation 300 yields a higher z value than allocation 304, OCS presumes that the z function increases as h decreases from zero. Such is exemplified by curve 393, which passes through points 310, 324, and 311. Initially, OCS experiments with increasingly negative h values until an inferior allocation is obtained; afterwards, it applies ICS.

FIG. 4A shows an elementary scenario tree, and the generation and use of Guiding Beacon Scenarios (GBSs). GBSs are applicable when there are more than two stages. At node 411, the first-stage allocations $a_1$ are made; at nodes 421 and 422, second-stage allocations $a_2$ are made; at nodes 431, 432, 433, and 434, third-stage allocations $a_3$ are made; and at nodes 441, 442, 443, 444, 445, 446. 447, and 448, fourth-stage allocations $a_4$ are made. Here, end-node identifiers are also used to designate scenarios; it is uncertain whether scenarios 441, 442, 443, 444, 445, 446, 447, or 448, will occur. (Vectors $w_1$, $w_2$, $w_3$ assume different realizations of random variables for the eight scenarios.) To evaluate a first stage $a_1$ allocation against, for example scenario 441, the first step is to determine the second stage allocations $a_2$. This is done by assuming both that $a_1$ is fixed, and that the GBS of node 421—either 441, 442, 443, or 444—will occur with certainty. Given those two assumptions, the allocations of $a_2$, $a_3$, and $a_4$ are re-optimized. The second step follows the first: Assuming that $a_1$ and $a_2$ are fixed, and that the GBS of node 431—either 441 or 442—will occur with certainty, $a_3$ and $a_4$ are re-optimized. The final step is to re-optimize $a_4$, holding $a_1$, $a_2$, and $a_3$ fixed, and assuming scenario 441 occurs with certainty. The value of this final re-optimization is the value of the $a_1$ allocation against scenario 441.

To generate GBSs, initially optimized $a_1$ allocations are randomly assigned to the second and third stage nodes. Then, starting with a third stage node, for example node 431, for each assigned $a_1$ allocation, and for each subsequent node (441 and 442), what are here termed Span Optimizations are performed: $a_2$, $a_3$, and $a_4$ are re-optimized, holding $a_1$ fixed, and assuming the subsequent-node scenario occurs with certainty. Afterwards, for each Span Optimization, $a_4$ is re-optimized holding $a_1$, $a_2$, and $a_3$ fixed, and assuming the other subsequent node(s) occur with certainty. Finally, the Span Optimization that performs best overall is identified, and its scenario is selected as the GBS. (For example, to determine the GBS for node 431, $a_2$, $a_3$, and $a_4$ are re-optimized holding $a_1$ fixed, and assuming scenario 441 occurs with certainty (Span Optimization); afterwards, $a_4$ is re-optimized holding $a_1$, $a_2$, and $a_3$ fixed, and assuming scenario 442 occurs with certainty. If the Span Optimization using scenario 441 performs better against scenarios 441 and 442 than the Span Optimization using scenario 442, then the GBS for node 431 is scenario 441.) The same is subsequently applied to the other third stage nodes. The GBSs for the second stage nodes are generated similarly, though the third-stage GBSs are assumed to occur with certainty.

FIGS. 2, 3A, 3B, 3C, and 4A, and this mathematical approach section are here to facilitate understanding, and should not be construed to define or bound the present invention.

Embodiment

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

The basic embodiment of the present invention will be discussed first. Afterwards, the preferred embodiment with its extensions of the basic embodiment, will be presented.

Here, an Object Oriented Programming (OOP) orientation is used. Pseudo-code syntax is loosely based on C++, includes expository text, and covers only the particulars of this invention. Well-known standard supporting functionality is not discussed or shown. Class names begin with a special capital letter that helps distinguish a class from the concept represented by the class. Variable names for class instances begin with a lower case letter and always include the class name. Data-types are usually implicit. Variables with suffix "Cntn" are instances of a general pointer-container class, whose elements can be fetched in a loop mechanism or referenced using an "[]" operator. The sequence in which objects are fetched from instances of the general pointer-container class is assumed to be constant; in order words, assuming the instance contains the same pointers, then every loop mechanism will always fetch the pointers in the same sequence, and similarly, the "[]" operator, with the same argument, will also fetch the same pointer. Variable voa (value of allocation), which is used in both classes and functions, contains the value of an optimized allocation or an aggregation of such values. Vectors and arrays start at element 0, which is frequently not used, so that element 1 corresponds to stage 1. Indentation is used to indicate a body of code or a line continuation. All variables (including matrixes and vectors) are passed to functions by reference. From now on, the term "optimize" (and cognates) may mean the application of formal mathematical techniques that yield global or local optimizations, but it also includes the application of any type of heuristic or rule-based decision-making procedure that would be expected to make or improve an allocation.

FIGS. 4A and 4B joined together show the general scenario tree used here. There are nStage allocations stages, $a_1$ through $a_{nStage}$, and $a_{nStage}$ is equal to, or greater than, two. Allocations may or may not be needed for the last stage; however, to facilitate exposition, last stage allocations are presumed required and are always addressed. Though the figure shows two nodes following most nodes, any number of nodes can follow all-but-the-last-stage nodes. Each last-stage node has a pointer to a wScenario object, which contains scenario particulars. The w vectors contain different realizations of the random variables.

FIG. 5 shows a skeletal definition of the WNode class. The first element, pGBS, is a pointer to a wScenario object that serves as the GBS. This element is applicable for the second through the last-stage nodes. For last-stage nodes, pWScenario is applicable, and points to a wScenario object, which defines a scenario. For the second through the next-to-the-last-stage nodes, xAllocRndCntn contains xAlloc objects, which in turn contain $a_1$ vectors, used for generating GBSs. Data member nodeProbability is the probability of reaching the node, given that the immediately preceding node has been reached. This class has a voa member. For all but the last-stage nodes, nextWNodeCntn contains subsequent nodes.

The skeletal definition of the WScenario class is shown in FIG. 6. The first element, wwMatrix, is a WWMatrix object, which is defined below and contains w vectors. The second element, pWNode, is a vector of pointers pointing to the wNodes that the scenario passes through. The probability of the scenario's occurrence is stored in nativeProbability. The function NativeOptimizer optimizes $a_1, a_2, \ldots, a_{nStage}$ allocations, assuming the scenario defined in wwMatrix occurs with certainty. The resulting $a_1$ vector is stored in nativeXAlloc.

Class XAlloc is a wrapper for $a_1$ vectors and is shown in FIG. 7. Variable feasible is a Boolean indicating whether vector $a_1$ is feasible; member variable h, which is not always used, is the value that was used to combine two $a_1$ vectors to yield the instance's $a_1$ vector. Member variable voa is the standard voa variable. This class also has an assignment operator to copy $a_1$ vectors and h scalars between instances and a comparison operator to compare the $a_1$ vectors of different instances. Comparisons between $a_1$ elements are done with a tolerance.

FIGS. 8A and 8B show class definitions of WWMatrix and AAMatrix, which respectively hold, as column-matrixes, vectors w and a corresponding to a complete scenario. The 0th column of both matrixes is not used so that columns correspond to stages: e.g., vector $w_3$ is stored in column ww[ ][3]; vector $a_4$ is stored in column aa[ ][4]. All elements of vectors w and a, and in turn arrays ww and aa, hold any data or function type required to define scenarios and specify allocations. All vector and matrix elements are not necessarily used, and no relationship or commonality necessarily exists between the elements in the same row of ww (or aa). Both classes have h and voa members, as previously described.

FIG. 9 outlines the EvaluateXAllocAgainstWScenario function, which is the pseudo-code implementation of the previously mentioned function f in equation 2.0. This function evaluates the $a_1$ vector contained in the first argument against the scenario contained in the second argument. Initially, an aaMatrix object is created and column aaMatrix.aa[ ][1] is loaded with the first-stage allocation vector (xAlloc.a1). Afterwards, stages two to nStage are iteratively re-optimized. During each iteration, the DeterministicOptimizer function is called with three arguments: iFlexStage is the starting stage for which allocations can be re-optimized; aaMatrix contains fixed allocations made prior to stage iFlexStage; and wwMatrix is the GBS for the iFlexStage stage of wScenario. The function finishes by passing voa to the first argument.

FIG. 10 outlines the DeterministicOptimizer function, which takes the three arguments just described. Assuming that the scenario defined in wwMatrix occurs with certainty and holding the allocations in aaMatrix prior to stage iFlexStage fixed, this routine applies standard state-of-the-art techniques to optimize allocations for stages iFlexStage through nStage. The first step is to evaluate and respond to what transpired up until the start of the iFlexStage. This could entail allocating resources to handle already incurred obligations, and could entail determining resource quantities that are available as of the iFlexStage stage. The second step is to look forward and optimize allocations for stages iFlexStage through nStage. This distinction between a first and second step is really artificial, since what is sought is a re-optimization of resource allocations: Given the portrayed situation, determine the optimal resource allocations for stages iFlexStage through nStage. This optimization process might entail applications of "if . . . then . . . " logic, "rules-of-thumb," heuristics, expert-system-like computer code, OR/MS optimization techniques, or any other data-process or optimization technique that helps to optimize resource allocations. Further, the flow through the routine might be contingent upon fixed-earlier-stage allocation(s) (aaMatrix), stage (iFlexStage), and/or GBS (wwMatrix); for any given function execution, multiple and on-the-fly creations/customizations of optimization models might occur and, between uses of such models, data manipulated. Here the word "optimization" and conjugates are used loosely, since true global optimization is not necessary. What is necessary is to develop an allocation for stages iFlexStage and beyond. A simple reasonable allocation, assuming the same result for the same iFlexStage, aaMatrix, and wwMatrix combination, would suffice. Obviously, though, the better the optimization, the better the final allocation. This function finishes by setting columns iFlexStage, iFlexStage+1, . . . , nStage of aaMatrix.aa equal to the optimized allocations for stages iFlexStage, iFlexStage+1, . . . , nStage, respectively; and calling the ValueAllocation function to set the voa value.

A major advantage of the present invention is that stochastic resource-allocation optimization can be done using a deterministic perspective in the DeterministicOptimizer function. Deterministic resource-allocation optimization is better understood, more advanced, and simpler than prior-art stochastic optimization. (Though DeterministicOptimizer function allows a deterministic perspective, such a perspective is not required. Hence, when a human expert defines DeterministicOptimizer functionality, it is acceptable to implicitly consider uncertainty.)

The ValueAllocation function, shown in FIG. 11, jointly assesses a scenario and an allocation to determine a voa value. This value represents the desirability to have the scenario-allocation pair occur, as opposed to having any other scenario-allocation pair occur. This could entail, for example, setting voa equal to:

the objective function value realized by the DeterministicOptimizer or the NativeOptimizer functions the cash balance at the end of the last stage the present-value of the stages' cash-flow stream a VNM utility value based upon the monetary value at the end of the last stage an aggregation of VNM utility values based upon monetary values at different stages a non-VNM utility functional value Philosophically, the ValueAllocation function interprets and converts the results of an optimization into units of one of the three fundamental objectives: monetary gain, monetary loss, or utility.

An advantage of the present invention is to permit the NativeOptimizer and the DeterministicOptimizer functions to use undefined or expedient-optimization objectives and have the ValueAllocation function interpret and value the results, so that optimal allocations can be made in the presence of uncertainty.

FIG. 12 shows the skeletal definition of the ZCluster class. The wScenarioCntn member contains wScenario objects belonging to the cluster. The first-stage allocations that perform best for the cluster are stored as xAlloc objects in xAllocBestCntn; the optimal first-stage allocation is also stored in xAllocOpt. The function XAllocEvaluator evaluates first-stage allocation xAlloc across all scenarios within the cluster; the ConsiderAppendBestXAlloc function manages xAllocBestCntn. The Improver function finds better first-stage allocations by using the SimpleParabolaSearch, InnerCompressSearch, and OuterCompressSearch functions. These functions in turn use several XAlloc instances: xAlloc0 and xAlloc1 are two good allocations used to find better allocations (and correspond to points 300 and 301 of FIG. 3A.); xAlloch is the result of merging allocations xAlloc0 and xAlloc1; xAlloc0off is an offset from xAlloc0 (and corresponds to point 304 of FIG. 3B); xAllocBnd is used by InnerCompressSearch to close-in on a better allocation (and corresponds to point 303 of FIG. 3B). Function GenxAlloch generates and evaluates xAlloch; variable wasImproved is a Boolean indicating whether GenxAlloch yielded an overall better first-stage allocation. Variable xAllocHurdle is an allocation to be surpassed in an iteration of Improver.

In Step 101, prior-art techniques are used to create scenarios and build a scenario tree, like that shown in combined FIGS. 4A and 4B, with wNode and wScenario objects. Scenario creation could be done by a human expert and/or by computer generation. Each scenario consists of a realization of exogenously-determined random variables. Scenarios may include exogenous changes to resource levels that occur during one or more of the stages. So, for example, a particular stage of each scenario may have a variable representing the realization of a contingent financial liability; such a realization changes available cash, and the optimizations/allocations are done assuming that available cash is appropriately reduced at the particular stage. (This does not rule out allowing insurance to be purchased in an earlier stage in order to offset the contingent-liability realization.)

If it is possible to obtain or calculate estimates of scenario probabilities, then such estimated values should be indicated in nativeProbability; if such estimates are not available, then all wScenario.nativeProbability values should be set to the inverse of the number of generated scenarios. After scenario creation, for each wScenario object, the NativeOptimizer function is called to optimize allocations for all stages within the scenario, assuming the scenario occurs with certainty. NativeOptimizer in turn calls ValueAllocation to properly determine voa. The resulting first-stage allocation is stored in nativeXAlloc, along with voa. If, in a given wScenario instance, there are multiple-globally-optimal first-stage allocations and they can easily be identified, then one should be randomly selected for storage in nativeXAlloc. (Programmatically, NativeOptimizer might call the DeterministicOptimizer function with a 1 value for iFlexStage, an empty aaMatrix, and the wScenario's wwMatrix.)

In Step 103, using the first-stage allocations contained in nativeXAlloc.a1 as coordinates, the wScenario objects are clustered (many prior-art clustering techniques are available). Clustering does not need to be academically pure: for instance, ordinal numeric values could be treated as if they were interval numeric values, some "difficult" fields ignored, etc. The value of nativeXAlloc.voa could also be used, though it is not necessary. A cluster may have one or more wScenario objects. Prior to clustering, vectors nativeXAlloc.a1 should temporally be normalized, so that some dimensions do not dominate the clustering process. For each identified cluster, instances of the ZCluster class are created and wScenarioCntn member is loaded with the wScenario objects belonging to the identified cluster.

In Step 105, where Guiding Beacon Scenarios are generated, the first operation is to set the pGBS member of each the last-stage wNode equal to the instance's member pWScenario. Next, all xAllocRndCntn containers in all wNode objects are emptied. Afterwards, the nativeXAlloc objects of all wScenario objects are weighted by nativeProbability, are randomly selected, and are loaded into the xAllocRndCntn containers of the second through nStage-1 nodes. (When there are only two stages, this Step 105 should be skipped.) Each such xAllocRndCntn container needs to be loaded with at least one nativeXAlloc; the same nativeXAlloc may be loaded into multiple xAllocRndCntn containers. The GBSs for stages two through nStage-1 are generated by:

```
AAMatrix aaMatrix;
for(iStage=nStage-1; 2 <= iStage; iStage--)
for(iNode=each iStage stage node)
{
   for(jNode=each iStage+1 stage node that follows
      iNode)
   {
      jNode.voa=0;
      for(kxAlloc=each xAlloc contained in xAllocRnd-
         Cntn of iNode)
      {
         copy vector a1 of kxAlloc to column-vector
            aaMatrix.aa[ ][1];
         DeterministicOptimizer(2, aaMatrix,
            jNode.pGBS→wwMatrix);
         jNode.voa=jNode.voa+
            aaMatrix.voa*jNode.nodeProbability;
         for(lNode=each iStage+1 stage node that follows
            iNode and is not equal jNode)
         {
            DeterministicOptimizer(iStage+1, aaMatrix,
               lNode.pGBS→wwMatrix);
            jNode.voa=jNode.voa+aaMatrix.voa*
               lNode.nodeProbability;
         }
      }
      Set jNode=the iStage+1 node that follows iNode and
         has the highest voa;
      iNode.pGBS=jNode.pGBS;
}
```

In Step 107, identifying the best allocations within the clusters entails:

```
for each cluster
{
   clear xAllocBestCntn;
   xAllocOpt.voa=negative infinity;
   for(iwScenario=each wScenario contained in
      wScenarioCntn)
      XAllocEvaluator(iwScenario.nativeXAlloc, TRUE);
}
```

The called XAllocEvaluator function member of the ZCluster class is:

```
ZCluster::XAllocEvaluator(xAlloc, OKadd)
{
VOA voa;
voa=0;
for(iwScenario=each wScenario in wScenarioCntn)
{
   EvaluateXAllocAgainstWScenario(xAlloc,
      iwScenario);
   voa=voa+xAlloc.voa*iwScenario.nativeProbability;
}
xAlloc.voa=voa;
//after the above first loop, the following is performed:
if(xAllocOpt.voa<xAlloc.voa)
{
xAllocOpt=xAlloc;
}
if(xAllocHurdle.voa<xAlloc.voa)
{
```

```
        xAllocHurdle=xAlloc;
        wasImproved=TRUE;
        }
    if(OKadd)
        {
        XAlloc xAllocDel;
        xAllocDel=xAlloc in xAllocBestCntn with lowest voa;
        ConsiderAppendBestXAlloc(xAlloc, xAllocDel);
        }
    }
ZCluster::ConsiderAppendBestXAlloc(xAllocAdd,
    xAllocDel)
    {
    if(xAllocAdd not in xAllocBestCntn)#
# Using the comparison operator of the XAlloc class. The purpose here is to
prevent xAllocBestCntn from being flooded with roughly equivalent alloca-
tions.
        {
        if(xAllocBestCntn.IsFull())
            {
            if(xAllocDel.voa<xAllocAdd.voa)
                {
                remove xAllocDel from xAllocBestCntn;
                add xAllocAdd to xAllocBestCntn;
                }
            }
        else
            add xAllocAdd to xAllocBestCntn;
        }
    else
        {
        find i such that xAllocBestCntn[i] equals xAllocAdd
            and xAllocBestCntn[i].voa is minimized;
        if(xAllocBestCntn[i].voa<xAllocAdd.voa)
            xAllocBestCntn[i]=xAllocAdd;
        }
    }
Step 109 entails:
for each cluster
    Improver();
Cluster member function Improver entails:
Improver()
    {
    Perform the following, one or more times:
        xAllocOpt.h=0;
        xAlloc0=xAllocOpt;
        Randomly select an xAlloc object from xAl-
            locBestCntn that has not previously been paired
            with (within current zCluster instance), and is
            different from, the current xAllocOpt.
        xAlloc1=randomly selected xAlloc;
        xAlloc1.h=1;
        xAllocHurdle=xAlloc1;
        xAllocBnd=xAlloc1;
        wasImproved=false;
        SimpleParabolaSearch();
        if(!wasImproved)
            InnerCompressSearch();
        if(!wasImproved)
            OuterCompressSearch();
        if(wasImproved)
            ConsiderAppendBestXAlloc(xAllocHurdle,
                xAlloc1);
        }
    The SimpleParabolaSearch function uses the parameter h,
which can range from negative to positive infinity. The
``` preferred values are between 0 and 1, with a slight extra preference for the value to be less than 0.5, presuming xAlloc0.voa is better than xAlloc1.voa. Pseudo-code follows:

```
ZCluster::SimpleParabolaSearch()
    {
    Do the following, one or more times, each time with a
        different h value:
        {
        GenxAlloch(h);
        if(0<xAlloch.h<xAllocBnd.h)
            xAllocBnd=xAlloch;
        if(wasImproved)
            {
            Determine the parabola passing through the follow-
                ing three points(where the first coordinate is the
                domain and the second coordinate the range):
                (0, xAlloc0.voa),
                (h, xAlloch.voa),
                (1, xAlloc1.voa);
            if(such a parabola exists and has a maximal value)
                {
                Set h2 equal to the domain value that yields the
                    maximal value;
                GenxAlloch(h2);
                }
            if(0<xAlloch.h<xAllocBnd.h)
                xAllocBnd=xAlloch;
            exit function;
            }
        }
    }
```

The GenxAlloch function, with its h argument, follows:

```
ZCluster::GenxAlloch(h)
    {
    for(i=0;i<number of elements in vector a1; i++)
        if(a1[i] is interval or ratio numeric)
            {
            xAlloch.a1[i]=(1−h)*xAlloc0.a1[i]+(h)*xAlloc1.a1
                [i];
            if(xAlloch.a1[i] should be discrete)
                round xAlloch.a1[i] to be discrete;
            if(xAlloch.a1[i] is necessarily out of bounds)
                bring xAlloch.a1[i] within bounds;
            }
        else if(a1[i] is an ordinal numeric)
            {
            set xAlloch.a1[i] equal the ordinal value that is
                closest to/most associated with:
                (1−h)*xAlloc0.a1[i]+(h)*xAlloc1.a1[i];
            }
        else
            {
            if(h<=0.5)
                xAlloch.a1[i]=xAlloc0.a1[i];
            else
                xAlloch.a1[i]=xAlloc1.a1[i];
            }
    //after the above first loop, the following is performed:
    xAlloch.h=h;
        if(xAlloch.a1 is feasible)
            {
            XAllocEvaluator(xAlloch, FALSE);
            xAlloch.feasible=TRUE;
            }
        else
```

```
{
    dis=minimum(abs(h), abs(h-1));
    xAlloch.voa=(lowest voa contained in xAl-
        locBestCntn's xAlloc objects)-(positive
        constant)*dis*dis;
    xAlloch.feasible=FALSE;
  }
}
```

Two approaches to "infeasible" first-stage allocations can be used. The first is simply to work with it; namely, have DeterministicOptimizer determine the result of attempting to implement such first-stage allocations. The second approach, which is shown above and is preferable, is to generate a penalty for non-feasibility. The penalty mechanism results in the allocation never being accepted, but is in keeping with the search techniques and allows processing to continue smoothly. (Note that infeasibility discussed in this paragraph is for first-stage allocations. Such allocations might result in "infeasibility" in subsequent stages, but as discussed previously, constraints can always be violated, though with consequences. Part of the purpose of the DeterministicOptimizer function is to evaluate, and work with, such consequences.)

The InnerCompressSearch function uses a parameter h3. This parameter needs to be between zero and xAllocBnd.h, such that the GenxAlloch function generates an xAlloch that is near, but not equal to, xAlloc0.

```
ZCluster::InnerCompressSearch()
{
  GenxAlloch(h3);
  xAlloc0off=xAlloch;
  if(xAlloc0.voa<xAlloc0off.voa)
  {
    do one or more times:
    {
      Determine the parabola passing through the follow-
        ing three points:
        (0, xAlloc0.voa),
        (xAlloc0off.h, xAlloc0off.voa),
        (xAllocBnd.h, xAllocBnd.voa);
      if(such a parabola exists and has a maximal value)
      {
        Set h4 equal to the domain value of the parabola
          that yields the maximal range value;
        if(h4 between 0 and xAllocBnd.h)
        {
          GenxAlloch(h4);
          xAllocBnd=xAlloch;
        }
        else
          exit function;
      }
      else
      {
        exit function;
      }
    }
  }
}
```

The OuterCompressSearch function uses a parameter hDec that can be any positive value.

```
ZCluster::OuterCompressSearch()
{
  XAlloc trailxAlloc1, trailxAllocm, trailxAllocr;
  XAlloc org0, org1;
  trailxAllocm=xAlloc0;
  trailxAllocr=xAlloc1;
  org0=xAlloc0;
  org1=xAlloc1;
  h5=0;
  do one or more times:
  {
    h5=h5-hDec;
    GenxAlloch(h5);
    if(trailxAllocm.voa<xAlloch.voa)
    {
      trailxAllocr=trailxAllocm;
      trailxAllocm=xAlloch;
    }
    else
    {
      trailxAlloc1=xAlloch;
      if(trailxAlloc1.feasible)
      {
        Determine the parabola passing through the fol-
          lowing three points:
          (trailxAlloc1.h, trailxAlloc1.voa),
          (trailxAllocm.h, trailxAllocm.voa),
          (trailxAllocr.h, trailxAllocr.voa);
        if(such a parabola exists and has a maximal
          value)
        {
          Set h5 equal to the domain value of the
            parabola that yields the maximal range value;
          GenxAlloch(h5);
          if(trailxAllocm.h<xAllocOpt.h)
            trailxAlloc1=trailxAllocm;
        }
      }
      xAlloc0=xAllocOpt;
      xAlloc1=trailxAlloc1;
      xAllocBnd=xAlloc1;
      xAllocBnd.h=1;
      InnerCompressSearch();
      if(InnerCompressSearch improved xAllocHurdle)
      {
        xAllocHurdle.h=xAlloc0.h-(xAlloc0.h-
          xAlloc1.h)*xAllocHurdle.h;
      }
      xAlloc0=org0;
      xAlloc1=org1;
      exit function;
    }
  }
}
```

If there is more than one cluster remaining, Step 113 is performed after Step 109. Similar to Step 103, using the zCluster's vector xAllocOpt.a1 as coordinates, the clusters are clustered into new larger clusters. For each identified new larger cluster:

create zCluster instance newZCluster;
for(each old cluster being merged into newZCluster)
   add each wScenario in oldZCluster.wScenarioCntn to newZCluster.wScenarioCntn;
for(each old cluster being merged into newZCluster)
{
   for(xAllocPrev=each xAlloc in oldZCluster.xAllocBestCntn)
   newZCluster.XAllocEvaluator(xAllocPrev, TRUE);
   destroy oldZCluster;
}

After the clusters have been merged, processing resumes at Step 109.

If there is only one cluster remaining, Step 115 is performed after Step 109. It entails implementing the first-stage resource allocations indicated in vector xAllocOpt.a1 of the last remaining zCluster. This vector, xAllocOpt.al, of the last remaining zCluster contains what is termed the Optimal Final Allocation. (After implementation and the subsequent actual realization of $w_1$, the complete process described here is repeated, with the second stage having become the first stage, the third stage having become the second, and so forth.)

Miscellaneous Considerations

Functions ZCluster::XAllocEvaluator (of each ZCluster instance), EvaluateXAllocAgainstWScenario, and DeterministicOptimizer should avoid repeating lengthy calculations when given the same arguments. This can be accomplished by the following: at the end of each function call, the arguments and results are stored; at the start of each function call, if the same arguments are being used again, then the associated previous results are retrieved.

Further along these lines, if the NativeOptimizer and/or DeterministicOptimizer functions generate difficult-to-reproduce intermediate results that could be used for re-optimization, then such results should be saved for reuse.

Example Resource Allocations

The following examples are presented here to demonstrate some of the uses, usefulness, and scope of the present invention. These examples are meant to be illustrative, and should not be construed to define or bound the present invention.

EXAMPLE 1

Designing a New Manufacturing Facility with Uncertain Future Demand

Capacity requirements for a new manufacturing facility are needed, but it is uncertain what they should be, because future product demand is uncertain and seasonal.

A five-stage resource-allocation optimization is appropriate here. The first stage concerns determining capacity levels or investments, and the second through the fifth stages concern allocating that capacity to meet seasonal demand. Scenarios are generated and a scenario-tree is constructed. The NativeOptimizer function member of each wScenario object determines optimal capacity, assuming the scenario's product-demand level (specified in wwMatrix) occurs with certainty. NativeOptimizer may entail use of expert-knowledge, may entail use of OR/MS optimization techniques, or may determine capacity in a crude and lax manner. NativeOptimizer calls ValueAllocation to compute ROI (return on investment) based upon first-stage capacity investments and the return during the four seasons.

Based upon first-stage capacity levels, the wScenarios are clustered into zCluster objects. WNode.xAllocRndCntn objects are loaded with wScenario.nativeXAlloc objects, and the GBSs are generated. Best first-stage capacity levels are identified and improved upon.

The DeterministicOptimizer function optimizes allocations for meeting seasonal demand, which correspond to stages two through five. The capacity allocations for stages iFlexStage through stage 5 are re-optimized, holding both first-stage capacity levels and allocations for stages two through iFlexStage−1 fixed. The function concludes by calling ValueAllocation to determine the ROI based upon first-stage capacity levels and the return during the four seasons. (In this case, the DeterministicOptimizer function is very different from the NativeOptimizer function, because the latter addresses optimizing capacity levels, given fixed demand—while the former addresses optimizing fixed-capacity allocations to best meet demand.)

Afterwards, the ZCluster::Improver function is executed for each instance and the zClusters are merged. The process repeats until only a single zCluster remains. This zCluster's xAllocOpt contains the optimal capacity levels for the new manufacturing facility.

EXAMPLE 2

Cash Management with Uncertain Receipts and Uncertain Payouts

Corporate treasurers typically manage cash in order to meet cash requirements and to maximize return. Both future requirements and future returns are frequently uncertain, and this invention can help optimize in the presence of such uncertainty.

The first step is to generate scenarios. Each stage of each scenario (i.e., each w vector) has the following:
A) for each existing and possible-future investment:
  cash requirements
  cash receipts
  acquisition price
  divestiture price
B) contingent realizations of:
  extra cash requirements
  extra cash receipts
C) status data concerning:
  interest rates
  stock market conditions.

After the scenarios are generated, they are loaded into the scenario-tree and wScenario objects and, for each wScenario, the NativeOptimizer function is executed. In this case, the NativeOptimizer function can call DeterministicOptimizer, with iFlexStage equal to one.

The DeterministicOptimizer optimizes cash management, given a deterministic situation. It may initially determine available cash for each stage and, as is possible, allocate such cash to the individual stages' cash requirements. If extra cash is available in various stages, such cash is optimally invested with consideration of definitely-known (i.e., certain) subsequent-stage requirements, rates of return, and transaction costs. If cash is short, then investments are optimally liquidated in various stages with consideration of definitely-known subsequent-stage requirements, rates of return, and transaction costs. And finally, the investments themselves are juggled with consideration of definitely-known subsequent-stage rates of return and transaction costs. Corporate policy may dictate certain constraints and, if possible, such constraints should be respected. (The variety of approaches here is innumerable, and this is but one approach.)

The DeterministicOptimizer function in this case could, and possibly should, entertain that which is usually considered unthinkable: defaulting on bonds, missing payroll, etc. In a given execution of this function, the allocations for stages iFlexStage and beyond could initially result in certain catastrophes, for example: defaulting on bond obligations and missing payroll starting in stage iFlexStage+3. The optimization process might improve the matter by changing the allocations of stage iFlexStage and beyond. This might result, for example, in meeting payroll in stage iFlexStage+3, and suffering a more-serious default in stage iFlexStage+4. (Clearly, making the best of the situation, i.e., optimization, entails ethical judgments, survival considerations, and trade-offs.)

The ValueAllocation function might return the present-value of the gains and losses occurring in each stage. Alternatively, it might return the sum of VNM utilities resulting from the gains and losses occurring in each stage.

Processing proceeds as previously described until there is one remaining zCluster, with its xAllocOpt.a1 allocation (Optimal Final Allocation) that indicates the cash allocations that should be made in the first stage.

EXAMPLE 3

Optimizing a Financial Portfolio with Uncertain Future Returns

An investor owns various financial instruments (FIs), cash, stocks, bonds, derivatives (options), commercial paper, etc. The investor wants to maximize the VNM-utility portfolio-value as of a year from now.

Scenarios are generated using state-of-the-art techniques. For each FI that is or may be owned, twelve monthly prices and returns are included in each scenario.

After the scenarios are generated, they are loaded into the scenario-tree and wScenario objects, and the NativeOptimizer function is executed. In this case, the NativeOptimizer function can call DeterministicOptimizer, with iFlexStage set equal to one.

The DeterministicOptimizer optimizes the purchases and sales of FIs, assuming the scenario occurs with certainty. This optimization may consider tax effects, transaction costs, discrete-block-size transacting requirements, etc. When first-stage allocations are optimized (i.e., iFlexStage=1) and if multiple first-stage allocations yield the same returns, then a random process is used to select a first-stage allocation from among the optimal first-stage allocations.

The ValueAllocation function notes the value of the portfolio at the end of the year, and converts the portfolio's monetary value into a VNM utility value. The VNM function can be specified by the investor using a series of connected points that map portfolio-monetary value to utility.

Processing proceeds as previously described until there is one remaining zCluster, with its xAllocOpt.a1 allocation (Optimal Final Allocation) that indicates which FIs the investor should presently own. Differences with actual present ownership are resolved by buying and selling FIs.

EXAMPLE 4

Portfolio Replication with Uncertain Coupling

Some investment institutions need to replicate a portfolio, but cannot obtain the portfolio's individual financial instruments (FIs). Instead, other FIs are purchased to compose an imitation portfolio (IP) that is expected to perform like the genuine portfolio (GP).

Such mimicry can be optimized with the present invention in an manner analogous to the portfolio example immediately above. Here, only first-stage allocations ($a_1$) that are expected to optimally endure a single realization of random events ($w_1$) are required. Scenarios are generated using state-of-the-art techniques. Each scenario comprises single-period performance samples for each of the GP's FIs, and for each of the FIs that can be used in the IP.

After the scenarios are created and loaded into the scenario-tree and wScenario objects, the NativeOptimizer function allocates cash to the FIs that can be used in the IP, such that the return of the IP equals the return of the GP contained in the wScenario object. It is likely that multiple allocations can yield the same return, and so a random process selects one such allocation.

In this example, the DeterministicOptimizer does nothing other than call the ValueAllocation function. ValueAllocation initially determines the difference between the performance of the GP and the IP. A special VNM utility function, like those shown in FIGS. 13A and 13B, is used to convert the performance difference into a utility or a voa value. In other words, the domain of these special VNM utilities functions is the difference (positive or negative) between the return of the IP and the return of the GP. (The utility function in 13A dictates seeking a strict parallel performance between the GP and the IP; while the function in 13B suggests wanting a performance roughly equivalent to the GP, though with a willingness to seek superior returns with the concomitant risk that inferior returns will result.)

Processing proceeds as previously described until there is one remaining zCluster, with its xAllocOpt.a1 allocation (Optimal Final Allocation) that specifies the FIs' quantities that should be owned to mimic the GP.

EXAMPLE 5

Allocating Organizational Resources in an Uncertain Environment

One of the more advanced methods for allocating resources is presented in the PRPA. Because that method sometimes uses Simple-scenario analysis (as described earlier herein) for allocating and pricing resources in an uncertain environment, those allocations might be sub-optimal. The present invention, however, can be coupled with the PRPA to make superior allocations.

In this example, uncertainty is presumed present in resource prices, product prices, potential demands, production coefficients, allocation-to-effectiveness-function specifications, and resource quantities. This example has three stages or time periods. At least some of the groups/Apertures cross stages; hence their allocations affect multiple periods.

The first step is to generate scenarios by randomly sampling for uncertain values. The generated scenarios are loaded into the scenario-tree and wScenario objects. NativeOptimizer function optimizes allocations, as described in the PRPA.

The ValueAllocation function determines the present-value of the changes in WI__Cash (or Internal Producer's Surplus) during each time period (stage).

The DeterministicOptimizer function performs optimizations holding first-stage, or first-and second-stage allocations fixed. Each execution entails (given the previous allocations and the fixed scenarios) determining available WI__Cash, subtracting out earlier-stage consumed resources, holding prior-stage group and non-group allocations fixed, and then re-optimizing.

Processing proceeds as previously described until only one zCluster remains. Its xAllocOpt.a1 allocations are the $a_1$ allocations to be initially implemented.

Conclusion

As the reader who is familiar with the domain of the present invention can see, this invention thus leads to optimized, or near-optimized, resource allocations when uncertainty is present. With such optimizations, both organizations and individuals can therefore better reach their goals.

While the above description contains many particulars, these should not be construed as limitations on the scope of the present invention; but rather, as an exemplification of one preferred embodiment thereof. As the reader who is skilled in the invention's domain will appreciate, the invention's description here is oriented towards facilitating ease of comprehension. Such a reader will also appreciate that the invention's computational performance can easily be improved by applying both prior-art techniques and readily apparent improvements.

Many variations and many add-ons to the preferred embodiment are possible. Their use frequently entails a trade-off between required-computer time and final-allocation quality, and their effectiveness can be situationally contingent. Examples of variations and add-ons include, without limitation:

1. The Improver function does not necessarily need to use xAllocOpt for xAlloc0. Instead, two different xAllocs from xAllocBestCntn could be randomly selected and copied to xAlloc0 and xAlloc1, preferably with xAlloc0.voa being superior to xAlloc1.voa. The random selection process should avoid repeated selection of the same pair in the same zCluster instance. Once clusters are merged, continuing to avoid repeating a pair might be desirable, since this would tend to focus searching in the space between the previous-smaller-merged clusters.

2. The Improver function can skip any or all of the three search functions (SPS, ICS, OCS). Omission results in obtaining a final allocation faster, though it is likely be inferior to what could have otherwise been obtained. (OCS is likely the least computationally efficient of the three functions.)

3. A further variation on variation #2 is to selectively use the Improver function. If, a priori, a single local optimum can be assumed for the z function, then performance could be improved as follows. After Step 105 clusters, here termed Modal-clusters, that may contain the optimal allocations are identified: clusters that have many scenarios and/or clusters that have scenarios with particularly high voa values are good Modal-clusters choices; clusters that would contain first-stage allocations as determined by Simple-scenario analysis and/or Convergent-scenario analysis are also good choices. After one or more Modal-clusters are identified, processing proceeds as previously described, except that 1) in Step 109, the Improver function is applied only to the Modal-clusters, and 2) in Step 113, when clusters are merged, if an old non-Modal zCluster object yields a superior xAlloc for the new zCluster object, then the old zCluster object's Improver function is immediately called, and the merging postponed until after the function is complete. (The result of merging a Modal with non-Modal-cluster(s) is a Modal-cluster.)

An extreme use of Modal-clusters entails, in Step 103, using an allocation resulting from Simple-scenario analysis as a seed to build a Modal-cluster having more than one wScenario objects. Afterwards, each wScenario object not included in the Modal-cluster is loaded into its own zCluster object (singleton). Then in each iteration of Step 113, only the singleton clusters relatively near the Modal-cluster are merged into the Modal-cluster, while the singletons relatively far from the Modal-cluster are not merged until a subsequent iteration of Step 113.

4. Standard line-search, non-derivative, and/or derivative based techniques could be incorporated in ZCluster::Improver for improving first-stage allocations (stored as xAlloc objects in xAllocBestCntn). Such techniques might require some adaptation, including, for instance, incorporation of response surface methods (RSM techniques). (See A. R. Conn, K. Scheinberg, and Ph. L. Toint "Recent Progress in Unconstrained Nonlinear Optimization Without Derivatives" *Mathematical Programming* 79 (1997), p. 397–414; and M. S. Bazaraa, H. D. Sherali, C. M. Shetty, *Nonlinear Programming Theory and Algorithms* 2nd ed., John Wiley & Sons. Inc., New York, 1993, [See particularly Chapter 8: "Unconstrained Optimization" p. 265–355]. Both references also cite relevant previous publications.) Incorporation of such standard line-search, non-derivative, and/or derivative based techniques in ZCluster::Improver will be termed here as StandardSearch.

An example of StandardSearch is the use of the sequential simplex search technique developed by Nelder and Mead: some or all of the xAlloc objects stored in xAllocBestCntn could be used to define the simplex, which is in turn used to generate additional xAlloc objects (in a manner analogous with the GenxAlloch function), which in turn are evaluated using XAllocEvaluator, which in turn redefine the simplex, etc.—all potentially leading to a superior xAlloc.

5. Well known genetic algorithms could be incorporated into the ZCluster::Improver function to combine existing xAlloc objects in xAllocBestCntn to form additional xAlloc objects, which are evaluated using XAllocEvaluator. Naturally, the better resulting xAlloc objects are added to xAllocBestCntn. Incorporation of genetic algorithms in ZCluster::Improver will be termed here as GeneticSearch.

A simple means to implement GeneticSearch is to include in the Improver function calls to a special version of GenxAlloch. This special version would be identical to the regular version, except that a different value for h would be randomly generated for each iteration of the first loop.

6. The equality-comparison operator of the XAlloc class could initially start with a loose tolerance, and as processing proceeds, become tighter. This might reduce potentially wasteful considerations of roughly-equal allocations, when there are numerous xAllocs in numerous zClusters.

7. If there are many scenarios in a cluster, the ZCluster::XAllocEvaluator function could use statistical inference to consider early termination. If statistical inference suggests that the resulting voa would not be very good, then xAlloc.voa should be set to the estimated not-very-good value, the function exited, and processing otherwise continued. (The drawn-sample-scenario sequence should be consistent.)

8. If there are many wScenario objects, then initial clustering could be nested: clusters are initially formed based upon $a_1$ allocations, then within each such cluster, another secondary clustering is done based upon $a_2$ allocations, and so forth. The final (smallest) clusters would then be loaded into the zCluster objects.

9. The maximum number of xAlloc objects held in ZCluster::xAllocBestCntn could be variable, and thus the thoroughness of the optimization adjusted. The Improver function, and the functions it calls, are continuously generating reasonable xAllocs that could be saved in xAllocBestCntn. Alternatively, after each iteration of the Improver function, xAlloc0 and/or xAlloc1 could be removed from xAllocBestCntn if they do not equal is xAllocOpt. Further, periodically the xAlloc objects in ZCluster::xAllocBestCntn could be evaluated for equivalence, and rough duplicates discarded.

10. Scenario specifications, i.e., wScenario.wwMatrix, could be used as proxies for clustering based upon first-stage allocations. When scenario generation is performed by using formal sampling techniques, i.e., area sampling, cluster sampling, stratified sampling, systematic sampling, etc., clusters frequently automatically suggest themselves. Such naturally occurring clusters can be used as bases for initially loading the zCluster objects.

11. Within each zCluster instance, any means can be used to create first-stage allocations (xAlloc objects), which then could be evaluated by the XAllocEvaluator function. Techniques for creating first-stage allocations include: generating a weighted average of the native XAllocs contained in wScenarioCntn, and generating a weighted average of the xAllocs contained in xAllocBestCntn. Any xAlloc created outside of a zCluster instance could also be used. Incorporation of such methods will be termed here as MiscSearch.

12. When multiple processors are available, they might desirably be used for parallel execution of multiple instances of the ZCluster::NativeOptimizer and the ZCluster::Improver functions and for parallel generation of GBSs. The generation of GBSs could be done by having each processor handle a branch of the scenario tree.

13. The GBSs can be regenerated at any time, which beneficially calibrates the GBSs to the current-optimization state. This requires: 1) weighting each cluster by the cumulative probability that the scenarios within the cluster will occur, 2) randomly assigning, based upon cluster probability, the clusters' xAllocOpt (or the xAllocs stored in the clusters' xAllocBestCntn) to the wNodes' xAllocRndCntn objects, and 3) proceeding with GBS generation as previously described.

14. Contingent-GBSs could result in better allocations, but require more effort to generate. Contingent-GBSs are particularly appropriate when earlier stage allocations make a significant difference for the later stages. For example, a household's resource allocation is being optimized; a decision to buy or not buy a first home significantly affects what can be done in subsequent stages. To generate Contingent-GBSs, processing proceeds as previously described for each contingent possibility: those xAllocs in wNode.xAllocRndCntn that result in the first variation are used to generate the first variation GBS; those that result in the second variation are used to generate the second variation GBS, and so forth. Returning to the example, suppose Contingent-GBSs are being developed for a fifth stage node; those xAllocs that result in purchasing-a-house in stages 1, 2, 3, or 4 are used to generate the "house bought" GBS; while those that result in not-purchasing-a-house are used to generate the "no house bought" GBS. (When optimizing stage 5 allocations, the "house bought" GBS is used if a house is bought during stages 1, 2, 3, or 4; otherwise, the "no house bought" GBS is used.)

The difficulty with this approach is that the xAllocs in xAllocRndCntn might not lead to every contingent variation. The simplest way around this is to suspend generating the Contingent-GBS until an xAlloc that results in the variation appears, and then using it to generate the GBS. (Such xAllocs could be accumulated, and each time one appears, the most recently accumulated xAllocs used to generate new GBSs.)

15. Better GBSs can be generated by merging several scenarios to create an optimal GBS. Merged-GBSs are particularly appropriate when a branch of the scenario-tree lacks a central scenario that can serve as a good GBS. Merged-GBSs, however, require more effort to generate.

Generating Merged-GBSs is analogous to finding optimal cluster allocations: rather than finding optimal allocations for a set of scenarios, optimal scenarios are found for a set of allocations. The following pseudo-code shows the Gen-MergedGBS class, which is conceptually based upon the ZCluster class, with WWMatrix replacing XAlloc. This pseudo-code generates a Merged-GBS for an iStage-stage node named iNode; execution begins at the MainBody function.

```
class GenMergedGBS()
{
  wwMatrixBestCntn;
  wwMatrixOpt;
  WWMatrixEvaluator(wwMatrix, OKadd)
    {
    AAMatrix aaMatrix;
    WWMatrix wwMatrixTemp;
    wwMatrixTemp=wwMatrix;
    wwMatrix.voa=0;
    for(each xAlloc in iNode.xAllocRndCntn)
      {
      copy xAlloc.a1 to aaMatrix.aa[][1];
      DeterministicOptimizer(2, aaMatrix,
        wwMatrixTemp);
      for(jNode=each iStage+1 node following iNode)
        {
        DeterministicOptimizer(iStage+1, aaMatrix,
          jNode.pGBS→wwMatrix);
        wwMatrix.voa=wwMatrix.voa+
          aaMatrix.voa*jNode.nodeProbability;
        }
      }
    // . . . Analogously follows code after first loop in
      ZCluster::XAllocEvaluator. . .
    }
  ConsiderAppendBestWWMatrix(wwMatrixAdd,
    wwMatrixDel);
  MainBody()
    {
    for(jNode=each iStage+1 node following iNode)
      WWMatrixEvaluator(jNode.pGBS→wwMatrix,
        TRUE);
    Improver();
    iNode.pGBS=(pointer to, copy of) wwMatrixOpt;
    }
  Improver();
  SimpleParabolaSearch();
  InnerCompressSearch();
  OuterCompressSearch();
  GenwwMatrixh(h)
    {
    Analogously follows ZCluster::GenxAlloch, except
      first loop is applied to all columns of wwMatrix.
    }
  wwMatrixHurdle;
  wasImproved;
  wwMatrix0;
  wwMatrix0off,
  wwMatrix1;
``` wwMatrixh;
wwMatrixBnd;
}

16. When scenarios cannot legitimately be merged, as is required for Merged-GBSs, Multiple-GBSs can be used. The central idea of Multiple-GBSs is to use several GBSs to generate multiple allocations, which in turn are merged.

Generating Multiple-GBSs is analogous to finding optimal cluster allocations: rather than finding an optimal allocation for a set of scenarios, an optimal blending of multiple allocations is determined and the blending steps are noted/recorded. Later, the blending steps are repeated for blending other allocations.

Two additional classes are required. The MAAMatrix class (meta AAMatrix) is the same as the AAMatrix class, except that it contains multiple aa arrays that are always accessed in the same order. The GenMultipleGBS class is analogous to the ZCluster class, with MAAMatrix replacing XAlloc, and is included in each wNode object having Multiple-GBSs.

The following pseudo-code shows the process of generating Multiple-GBSs for an iStage-stage node iNode. (For ease of comprehension, each node immediately following iNode is assumed to have a single GBS, as opposed to multiple GBSs.):

```
MAAMatrix mAAMatrix;
AAMatrix aaMatrix;
GenMultipleGBS gmGBS;
gmGBS.nElemAAMatrixBestArray=0;
gmGBS.iStage=iStage;
    gmGBS.iNode=iNode;
    gmGBS.nRecorder=0;
    for(jNode=each iStage+1 node following iNode)
        {
        empty mAAMatrix of aa arrays;
        for(each xAlloc in iNode.xAllocRndCntn)
            {
            copy xAlloc.a1 to aaMatrix.aa[][1];
            DeterministicOptimizer(2, aaMatrix,
                jNode.pGBS→wwMatrix);
            Add aaMatrix.aa to mAAMatrix;
            }
        gmGBS.MAAMatrixEvaluator(mAAMatrix, TRUE);
        }
    gmGBS.Improver();
```

The GenMultipleGBS class is conceptually based upon the ZCluster class, with MAAMatrix replacing XAlloc.
class GenMultipleGBS: public ...
{
iStage;
iNode;
struct
    {
    index_h0;
    index_h1;
    h;
    index_hResult;
    }recorder[];
nRecorder;
mAAMatrixBestArray[]; //analogous with xAllocBestCntn.
nElemAAMatrixBestArray;
mAAMatrixOpt;
iMax;
MAAMatrixEvaluator(mAAMatrix, OKadd)
{
mAAMatrix.voa=0;
for(jNode=each iStage+1 node following iNode)
    {
    for(aaMatrix=each aa array contained in
        mAAMatrix)
        DeterministicOptimizer(iStage+1, aaMatrix,
           jNode.pGBS→wwMatrix);
        mAAMatrix.voa=mAAMatrix.voa+
           aaMatrix.voa*jNode.nodeProbability;
        }
    }
    // ... Analogously follows code after first loop in
        ZCluster::XAllocEvaluator ...
}
ConsiderAppendBestMAAMatrix(mAAMatrixAdd,
    mAAMatrixDel)
{
if(nElemAAMatrixBestArray==0||
    mAAMatrixBestArray[iMax]
        .voa<mAAMatrixAdd.voa)
    imax=nElemAAMatrixBestArray;
mAAMatrixBestArray
    [nElemAAMatrixBestArray++]=
    mAAMatrixAdd;
//positions need to be kept constant and elements not
//removed, so that re-play works correctly.
}
Improver()
{
Follows ZCluster::Improver, except that when and if ConsiderAppendBestMAAMatrix is called because an iteration yields an improvement over the beginning mAAMatrixHurdle, the following is also done after the call to ConsiderAppendBestMAAMatrix:
    {
    recorder[nRecorder].index_h0=i, such that
        mAAMatrixBestArray[i]=mAAMatrix0;
    recorder[nRecorder].index_h1=i, such that
        mAAMatrixBestArray[i]=mAAMatrix1;
    recorder[nRecorder].h=mAAMatrixHurdle.h;
    recorder[nRecorder].index_hResult=i, such
        that    mAAMatrixBestArray[i]=
        mAAMatrixHurdle;
    nRecorder++;
    }
}
SimpleParabolaSearch();
InnerCompressSearch();
OuterCompressSearch();
GenMAAMatrixh(h)
{
for(k=each aa matrix in mAAMatrix)
    {
    Analogously apply first loop of ZCluster::GenxAlloch to merge columns 1 through iStage of kth aa array of mAAMatrix0 and mAAMatrix1 into columns 1 through iStage of kth aa array of mAAMatrixh.
    }
// ... Analogously follows code after first loop in
    ZCluster::GenxAlloch ...
}
mAAMatrixHurdle;
wasImproved;
mAAMatrix0;

```
    mAAMatrix0off;
    mAAMatrix1;
    mAAMatrixh;
    mAAMatrixBnd;
}
```

Using Multiple-GBSs for generating the iStage-stage allocations for iNode entails not directly calling the DeterministicOptimizer function in EvaluateXAllocAgainstWScenario, but doing the following instead:

```
{
aaMatrixArray[]; //i.e., array of AAMatrix objects.
i=0;
for(jNode=each iStage+1 node following iNode)
    {
    DeterministicOptimizer(iFlexStage, aaMatrix,
        jNode.pGBS→wwMatrix);
    aaMatrixArray[i++]=aaMatrix;
    }
for(i=0; i<gmGBS.nRecorder; i++)
    {
    using:
        aaMatrixArray[gmGBS.recorder[i].index_h0].aa[]
            [iStage],
        aaMatrixArray[gmGBS.recorder[i].index_h1].aa[
            ][iStage],
        gmGBS.recorder[i].h;
    apply processing analogous to first loop of ZCluster-
        ::GenxAlloch to create merged values for column:
        aaMatrixArray[gmGBS.recorder[i].index_hResult].aa
            [][iStage].
    }
Copy column aaMatrixArray[gmGBS.recorder[iMax]
    .index_hResult].aa[][iStage] to column aaMatrix.aa[]
    [iStage].
}
```

(Note: When looping through the jNode objects, the sequence of fetching jNode objects needs to be consistent.)

17. Besides allocating resources, this invention can also value resources, which as previously described, can be used to allocate resources.

Define a function zz(q,c) that both uses this invention (with an unchanging scenario-tree and associated scenarios; [the GBSs, however, may change]) to determinate an optimal allocation and that returns a computed z value for equation 2.0, given that the available on-hand quantity of a particular resource changes by q, and given that available on-hand cash changes by c. (Both q and c can apply to different stages.) Given a particular q, well known numerical techniques can be used to find c such that:

$$zz(0,0)=zz(q,c)$$

By economic theory, the value of the $|q|$ units of the particular resource is $|c|$: if q is negative, then c is the minimal value that should be received for selling $-q$ resource units; if q is positive, then $-c$ is the maximal value that should be paid for buying q resource units. For small q, $|c/q|$ equals unit price for the particular resource and such a price can be used for pricing.

Another means to generate similar data is to generate supply and demand curves. If, within the scenarios, a resource can be sold and/or purchased, then resource supply and demand curves can be generated by varying resource price, performing Steps 101 through 113 with the same wScenario objects, and noting the resulting resource quantity changes. (Conceptually, produced products and services can be handled as a bundle of resources. Depending on the DeterministicOptimizer and NativeOptimizer functions, the q discussed here could instead reference produced product and service quantities.)

Given a resource optimization method, how to value and price resources and how to beneficially use such values and prices is well known by economists. The point of this variation is that this invention can be used, as a resource optimization method, in conjunction with prior-art techniques to determine and use resource prices and values. And once such prices and values are determined, they can be used for internal pricing and for deciding whether to buy or sell on the open market.

18. Step 103 is not necessarily required, and it is acceptable, instead, to place all scenarios created in Step 101 into a single ZCluster. This could be desirable when there are only a few scenarios (and hence clustering is not worth the effort) or when the clusters are highly disparate.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What I claim is:

1. A computer system for optimally allocating organizational resources comprising:
   means for obtaining at least two scenarios;
   means for obtaining at least a first-stage allocation for at least two of said scenarios; and
   means for determining an Optimal Final Allocation including:
      means for separately optimizing said first-stage allocations against each scenario such that said optimizing means generates additional stage allocations,
      means for re-optimizing the additional stage allocations against each scenario, and
      means for resolving infeasibilities that may occur during said means for optimizing and said means for re-optimizing.

* * * * *